Dec. 9, 1969     J. E. WHITMAN     3,482,534
APPARATUS AND METHOD FOR HANDLING AND BURNING A FINELY
COMMINUTED SOLID
Filed Feb. 13, 1969     13 Sheets-Sheet 11
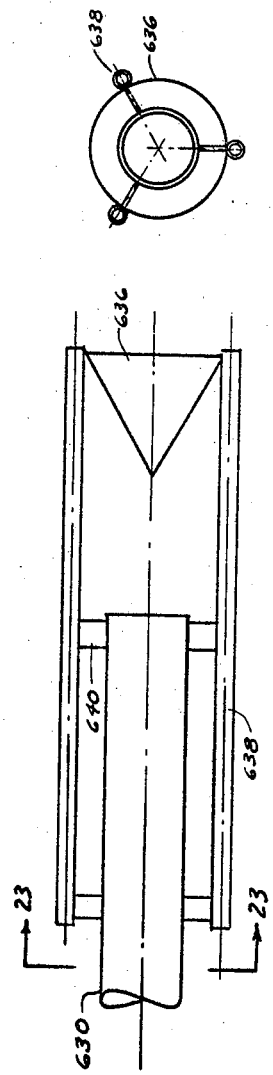
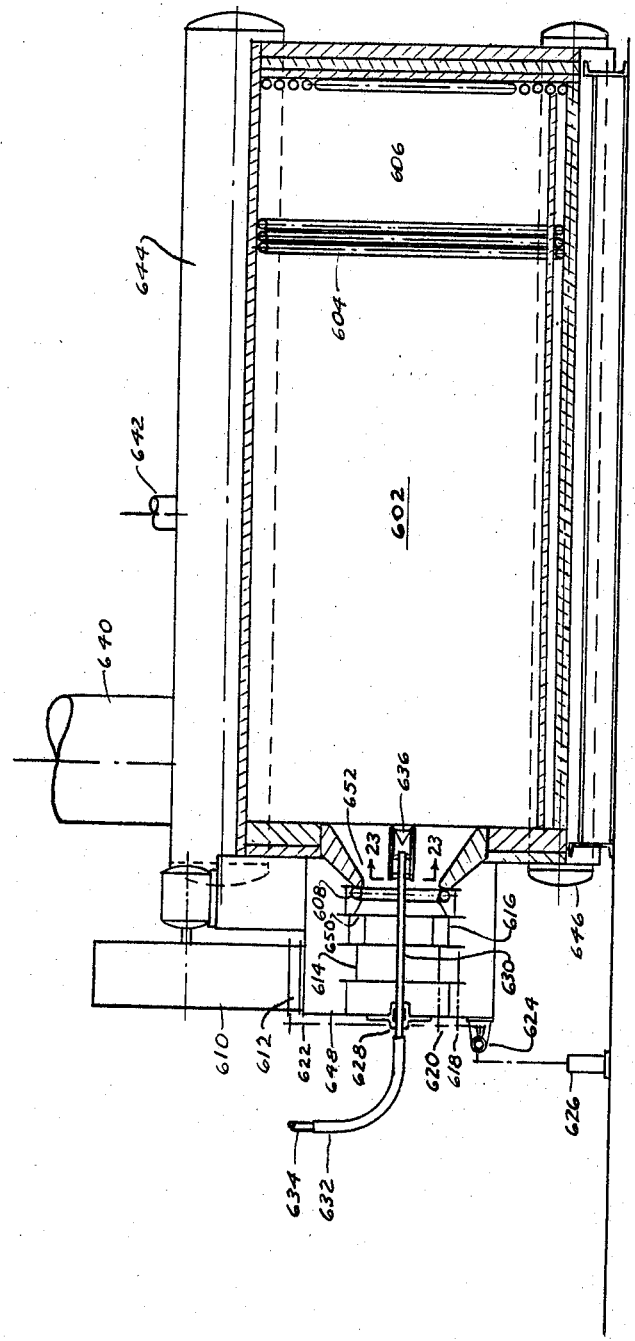
INVENTOR
John E. Whitman

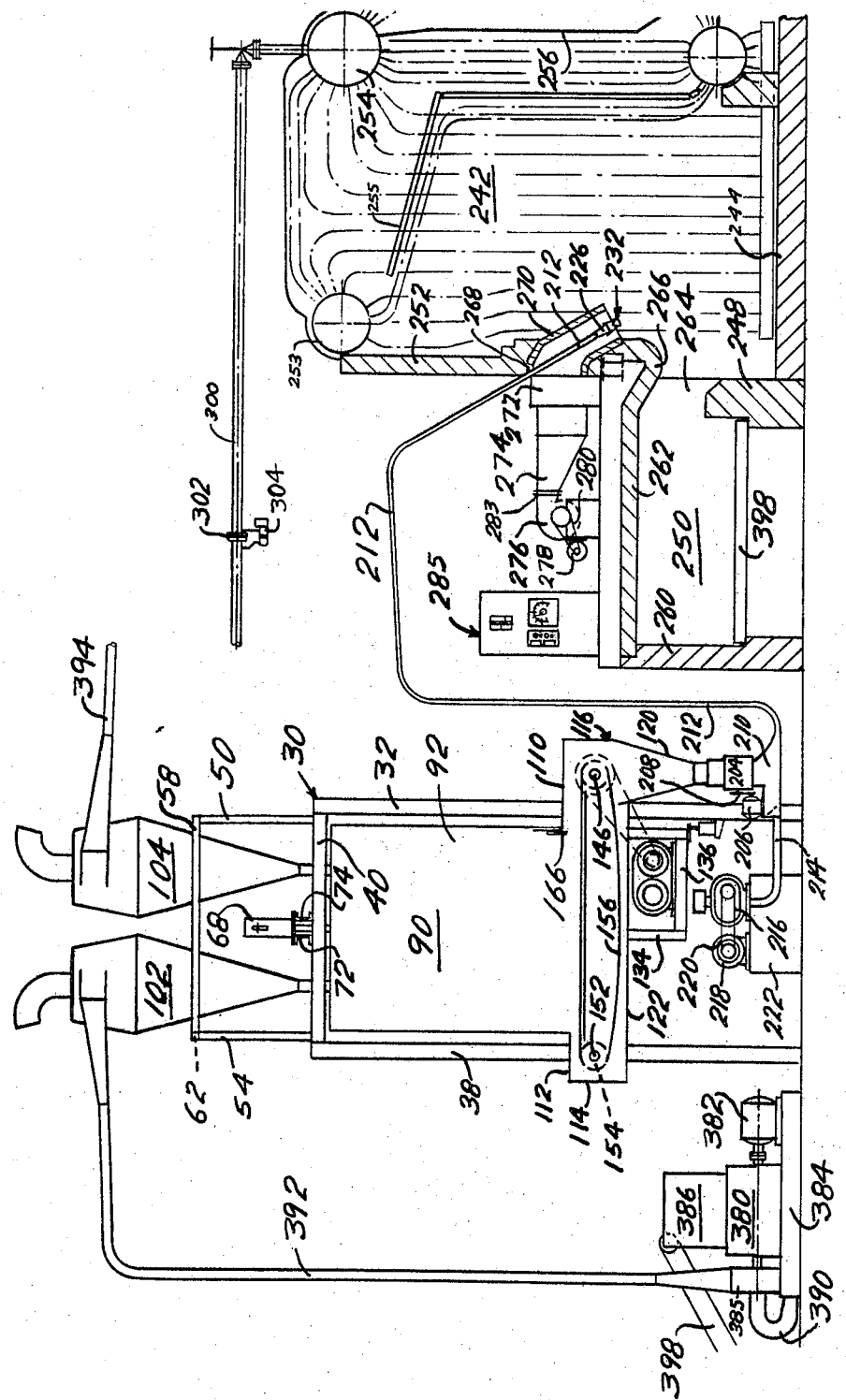

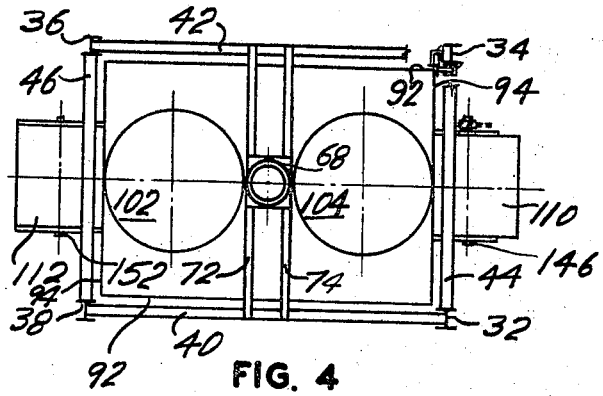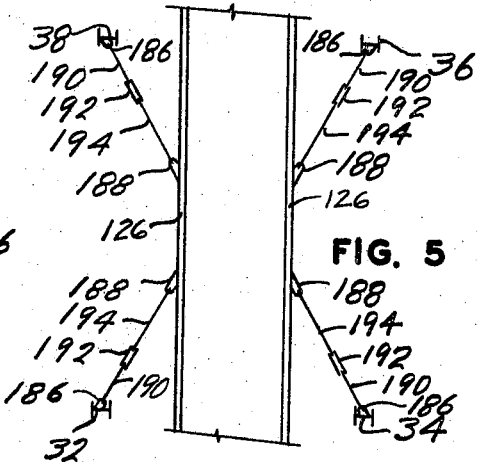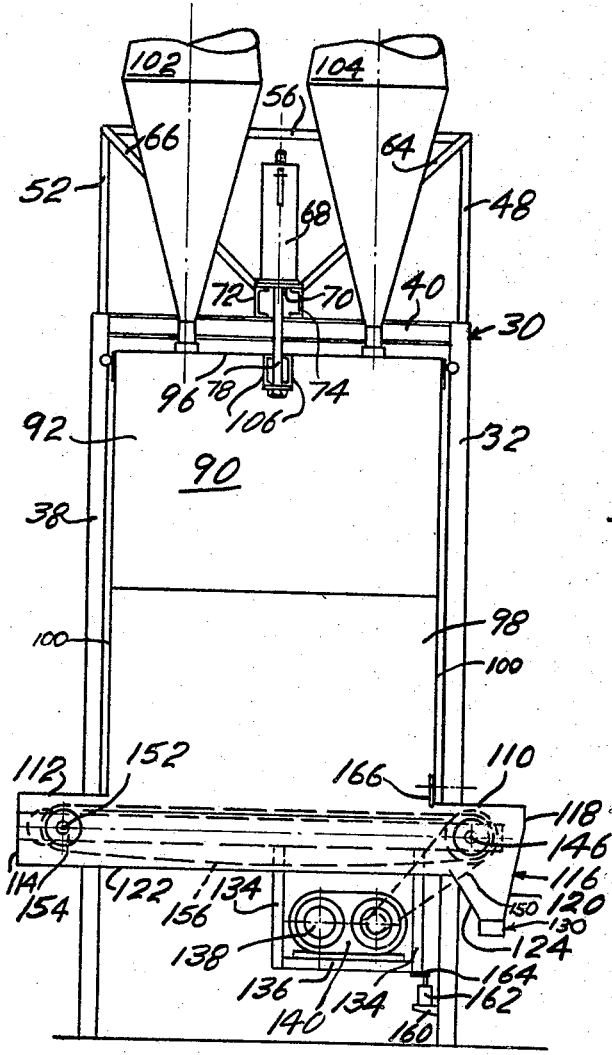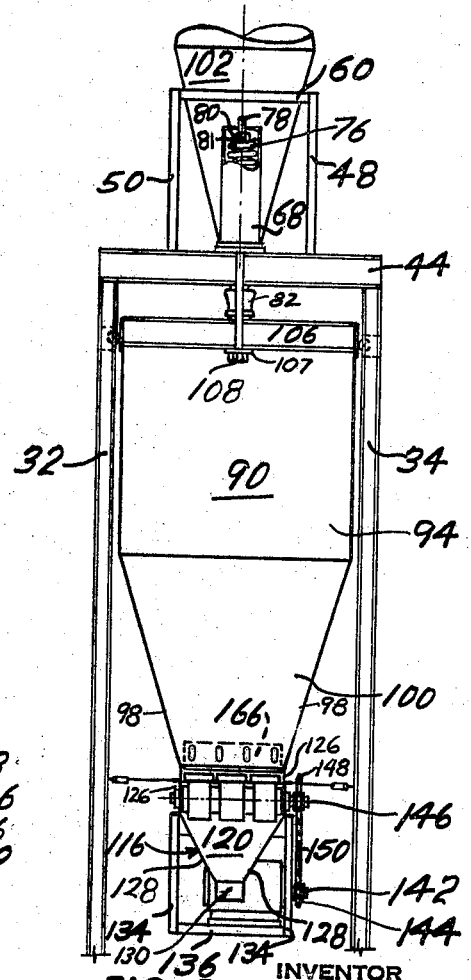

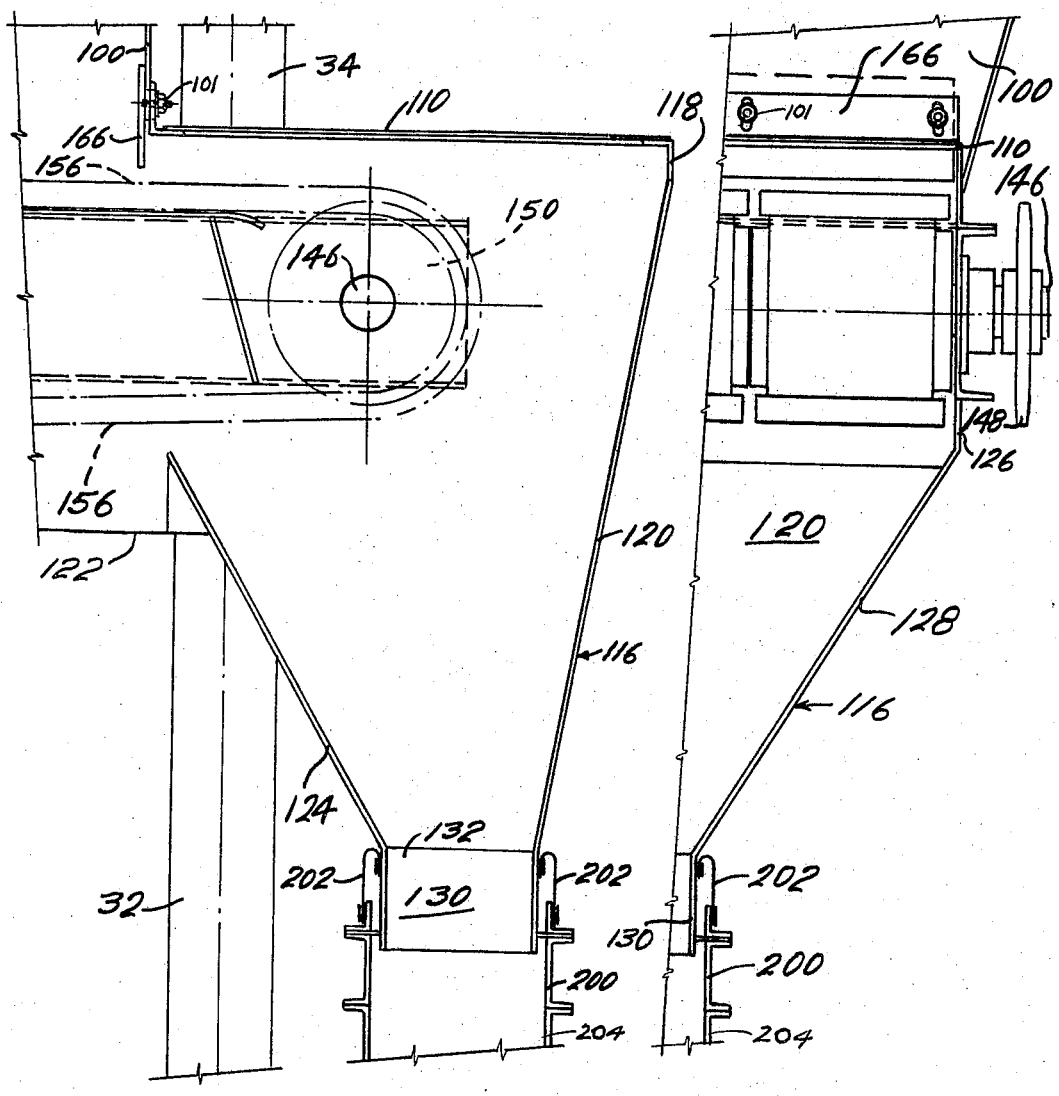

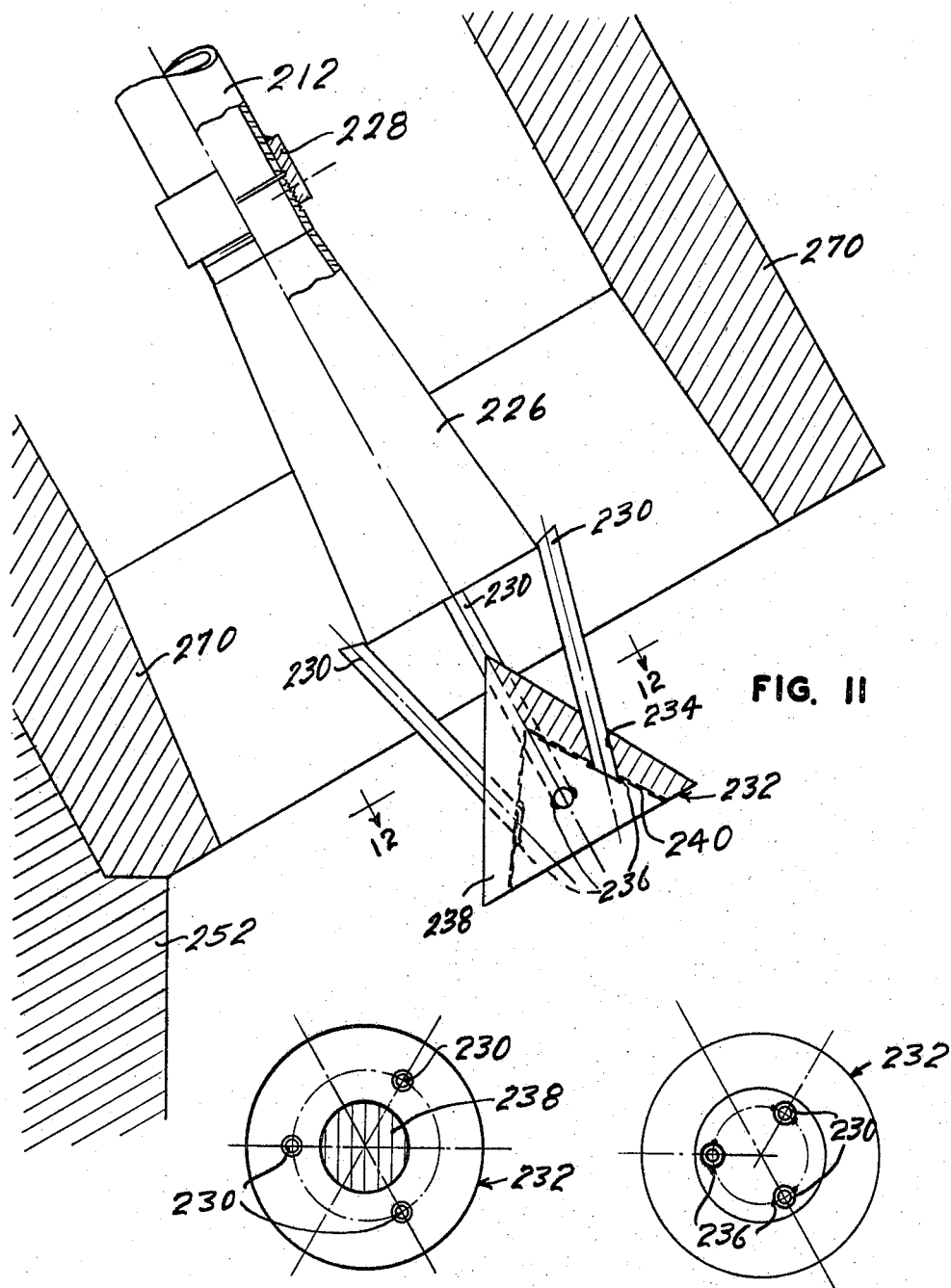

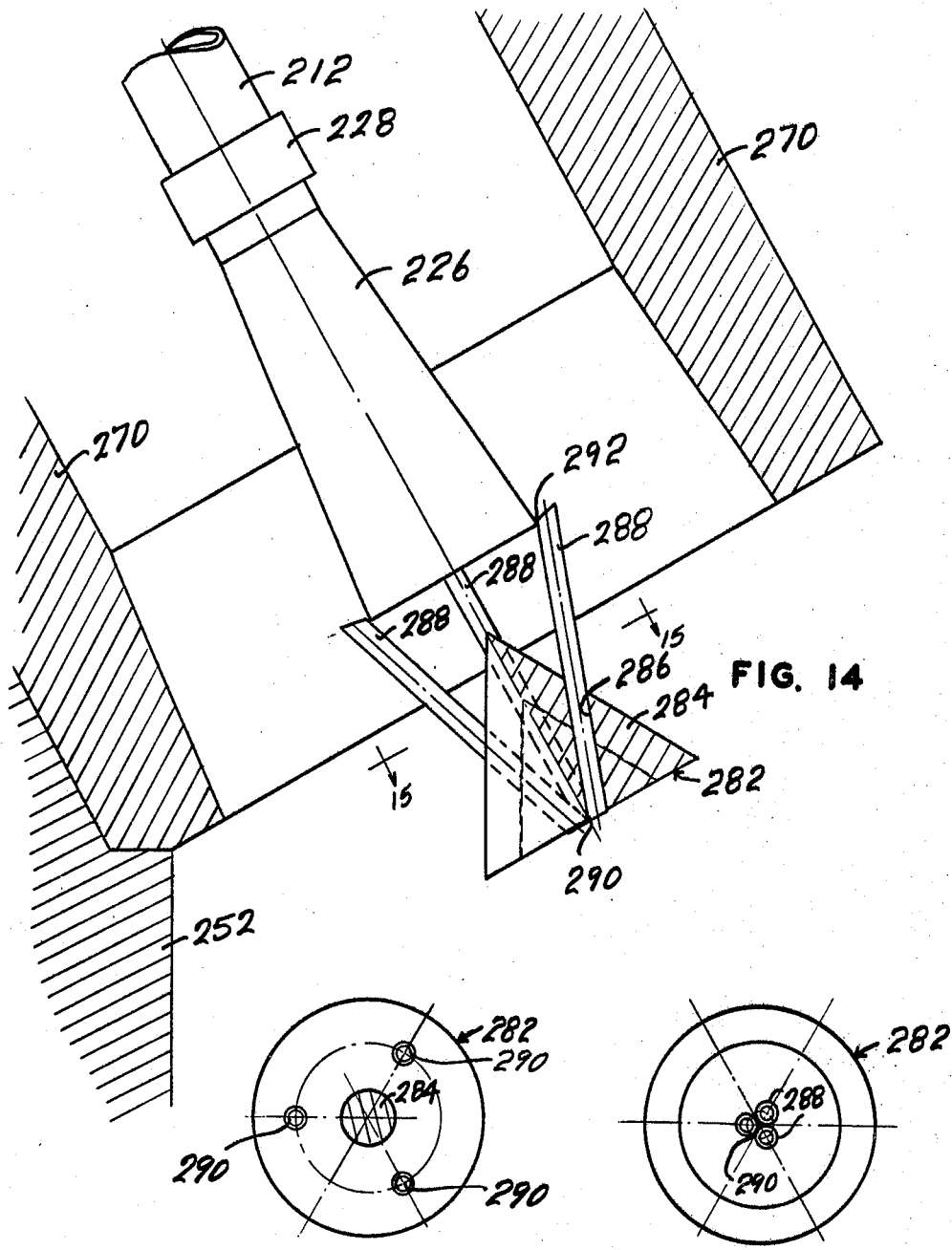

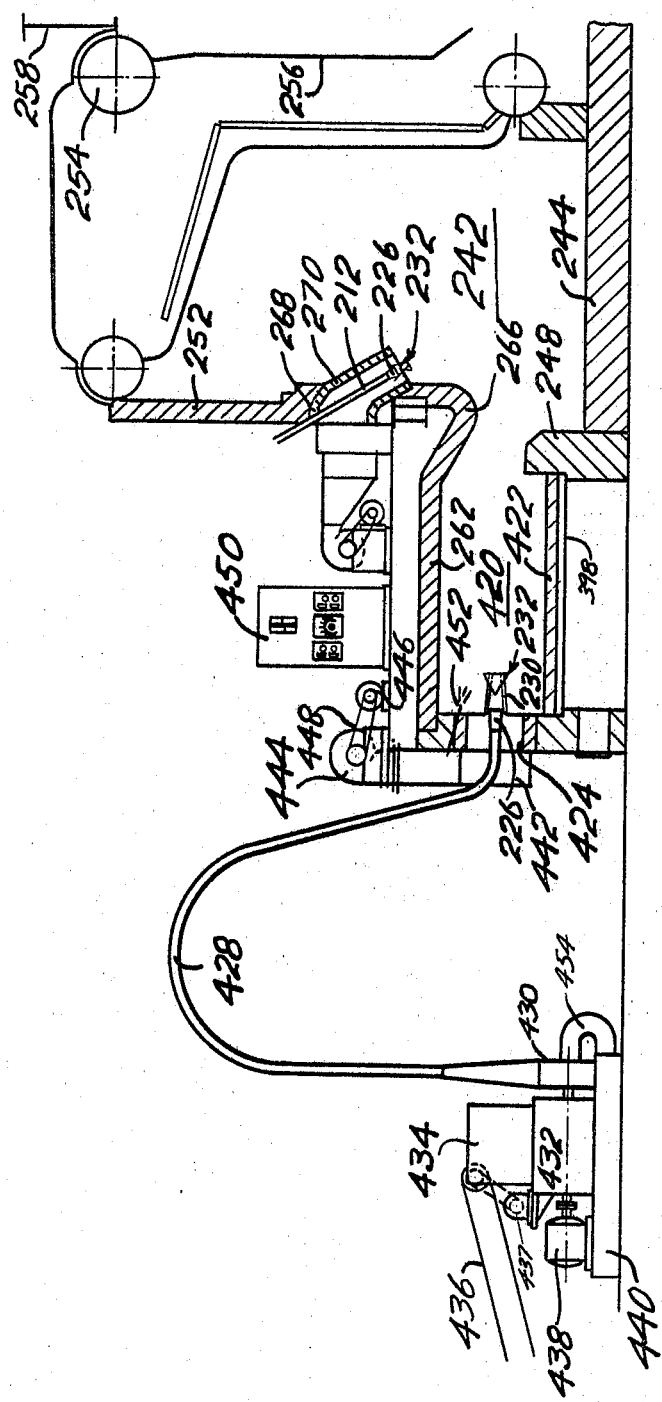

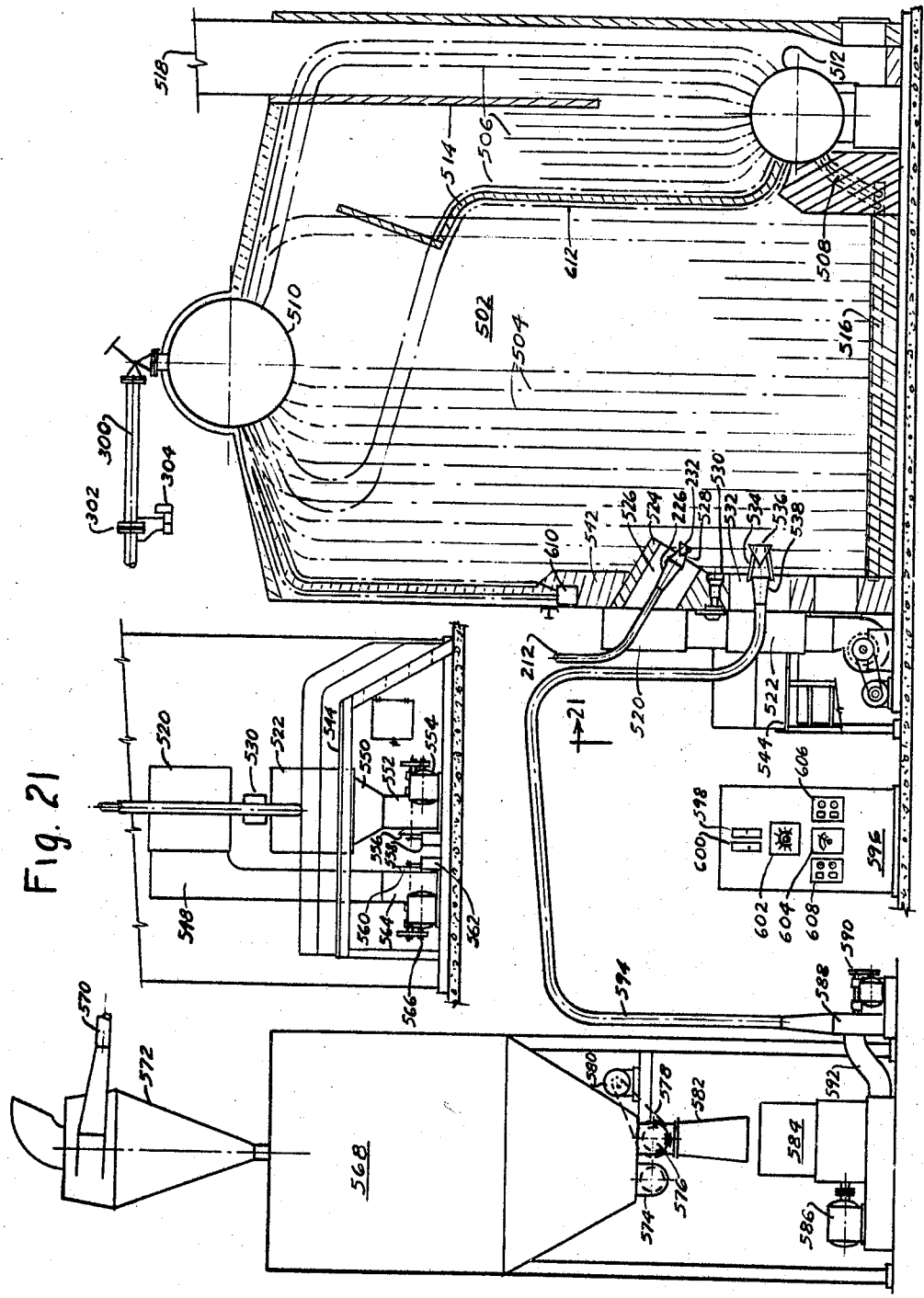

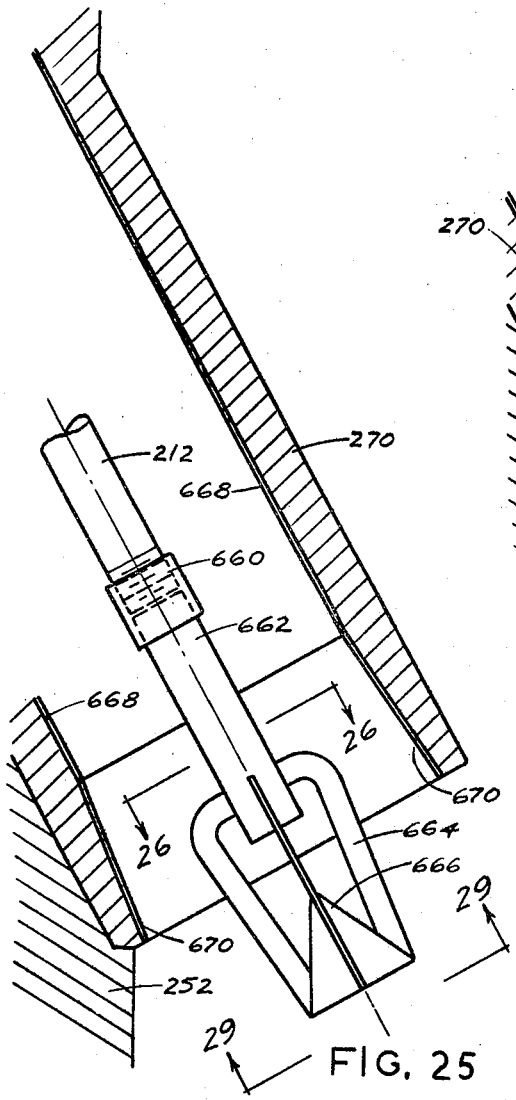
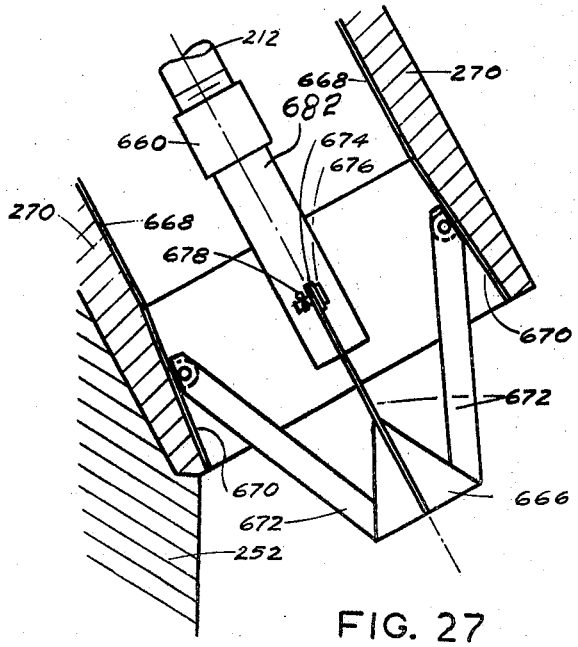
FIG. 27
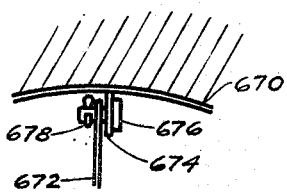
FIG. 28
FIG. 25
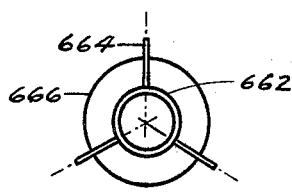
FIG. 26
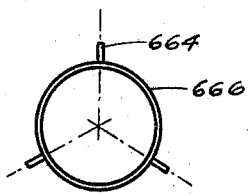
FIG. 29

_United States Patent Office_  3,482,534
Patented Dec. 9, 1969

3,482,534
APPARATUS AND METHOD FOR HANDLING AND BURNING A FINELY COMMINUTED SOLID
John E. Whitman, 9253 24th Ave. NW.,
Seattle, Wash. 98107
Continuation-in-part of application Ser. No. 532,787, Mar. 8, 1966. This application Feb. 13, 1969, Ser. No. 814,870
Int. Cl. F23r *1/14;* F23k *3/02*
U.S. Cl. 110—28                               31 Claims

ABSTRACT OF THE DISCLOSURE

This invention is primarily for an apparatus for burning a finely comminuted combustible solid, and also for storing, measuring, dispensing and conveying said solid. It also is for the grinding and suspension firing of wet or dry waste wood or waste paper products. While either system would effect a substantial improvement in combustion, both systems in simultaneous operation provide ideal combustion conditions.

---

This application is a continuation-in-part of my copending patent application entitled Apparatus and Method for Conveying and Burning a Finely Comminuted Solid, Ser. No. 532,787, filing date of Mar. 8, 1966, now abandoned.

In a plywood mill the surface of the plywood is finished by sanding the plywood. As a result of the sanding, there is produced a sander dust. The sander dust is difficult to handle as it is stringy, "balls up," has a tendency to "bridge," is difficult to measure quantitatively, presents a fire and explosion hazard, and is generally a nuisance to handle. In addition, there is produced a substantial quantity of waste wood known as "hog fuel," so-called because it has been sized by being fed through a chipper or hog. Because of its marginal salability, it is usually fired in a hog fuel boiler to produce the steam needed for plywood manufacture. The fuel is fired by stoker or in a Dutch oven—the latter shown in FIGS. 1 and 19. In either case, particle size of 1″ to 2″ maximum requires the use of grates to keep combustion air in contact with the burning fuel. Combustion efficiency is low, response to plant load changes slowly, and wet fuels reduce furnace temperatures causing steam pressures to drop. This increases drying rate time of the plywood and sharply adds to its cost of production. Also, this poor combustion is directly related to the production of atmospheric pollutants and such plants are credited with being major contributors to air pollution. As is well known, a mixture of dust and air in the proper proportion, when contacted with a spark or a flame, results in an instantaneous combustion generally known as an explosion. When I was presented with this problem of handling a finely comminuted combustible solid such sander dust, I invented this method for storing, dispensing, conveying and burning the finely comminuted combustible solid. Briefly, the solid is mixed with air in a proportion such that the air and the solid can be conveyed in a tube and, also, under such conditions that combustion most likely will not occur while being conveyed in the tube. Then, the solid and air mixture is blown into a region where combustion is taking place and the solid and air mixture is mixed with additional air so as to burn this solid. Fortunately, the addition of the sander dust portion of this invention to a furnace increased the steam output of a boiler by at least fifty (50) percent over the previous output of the same boiler. In addition, unburned particles carried over from the Dutch oven were "burned out" by the secondary flame from the sander dust, substantially reduced the amount of pollution emitted to the atmosphere. Complete elimination requires the firing of a higher ratio of dust to hog fuel than presently available, or requires the improving of the condition of the hog fuel and its method of firing. The second part of the invention concerns itself with conditioning the hog fuel by grinding it to a ⁵⁄₁₆″ particle size, permitting it to be fired in suspension. The size and amount of unburned particles entering the furnace are sharply reduced enabling the sander dust fire to effect total burnout thereby eliminating, for all practical purposes, the carryover of smoke or other pollutants to the atmosphere. Accordingly, objects and advantages of this invention are the provision of a hotter flame or a flame having a higher temperature than previously realized with the burning of a waste product such as sander dust and finely comminuted solids; the provision of means for applying this flame so as to effect uniform furnace temperatures for indefinite periods of time; the provision of means for obtaining this flame irrespective of, and independent from, the production rate of sander dust in the manufacturing process; the provision of means for controlling the shape and direction of the flame to increase boiler output and reduce pollution; the provision of means to consume a waste and nuisance material; a mean to decrease the possibility of combustion occurring in the conveyor tube conveying a mixture of air and a finely comminuted solid; provision of a means and method to produce a cleaner flame than previously obtained; means and method to decrease air pollution or to lessen air pollution; an inexpensive means to store a finely comminuted combustible solid and to dispense the solid; a means which is relatively inexpensive to construct and to install in existing and plywood factories under construction or contemplation; a means which is inexpensive to maintain as it has relatively few mechanical features; a means which has self-cooling supports enabling the burner head to be positioned in the hot furnace; a means and method which provides a high concentration of a finely comminuted combustible solid to air so as to preclude combustion when combustion is not desired; a means and method to provide a more complete combustion of the finely comminuted combustible solid when desired; a means and method to supervise close control of furnace temperature; a means and method of burning a solid which makes it possible to realize the longer life from the refractory in the furnace; a means and method which makes it possible to maintain more uniform furnace temperatures despite variations in gases from the hog fuel sent to the furnace from the Dutch oven; a means and method which makes it possible to realize an increased steam flow output from a boiler; a means and method for controlling combustion so as to decrease the possibility of boiler damage from overheating, or from interrupting circulation in the boiler tubes; a means and method which decreases the possibility of an explosion in the furnace due to the accumulation of dust in the furnace; and, a means and method which more precisely controls the flame pattern so as to distribute the flame more evenly across the furnace.

These and other important objects and advantages of the invention will be more particularly brought forth upon reference to the accompanying drawings, the detailed specification of the invention and the appended claims.

In the drawings:

FIGURE 1 is a schematic view illustrating the invention for burning the finely comminuted combustible solid in a furnace for generating steam in a boiler, and for conveying the solid from a storage bin to the furnace;

FIG. 2 is a side elevational view of the storage bin, including a dispensing means, for storing and dispensing the finely comminuted solid;

FIG. 3 is an edge elevational view of the storage bin including the dispensing means;

FIG. 4 is a plan view looking down on and into the storage bin;

FIG. 5 is a fragmentary plan view illustrating guide lines for positioning the lower end of the storage bin;

Figure 8:
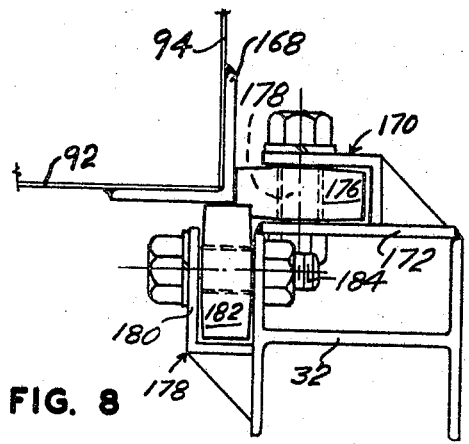
Figure 10:
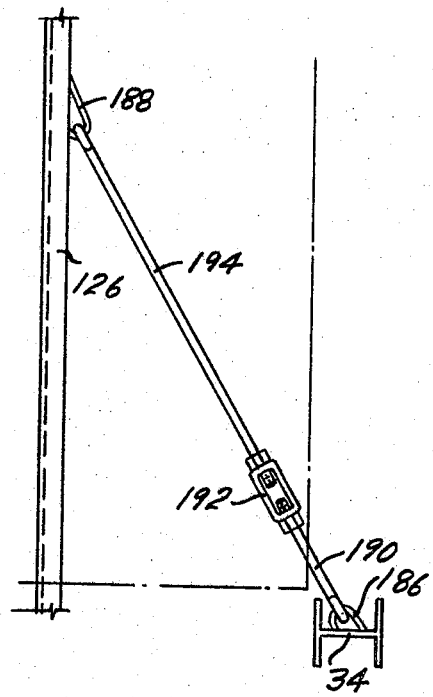
Figure 9:
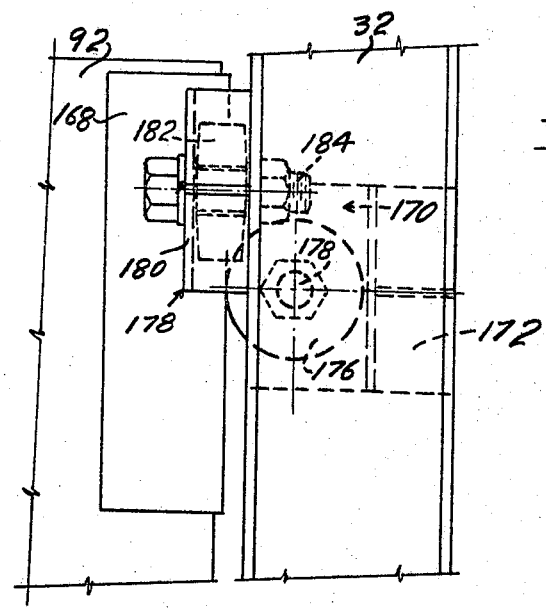

FIG. 6 on an enlarge scale, is a fragmentary side elevational view of the dispensing means including the transition hopper for dispensing the solid from the storage bin;

FIG. 7 is an edge elevational view of the dispensing means including the transition hopper for dispensing the solid from the storage bin;

FIG. 8 is a fragmentary plan view of an upper edge of the storage bin and the frame and illustrates guide rollers for guiding the storage bin;

FIG. 9 is a fragmentary side elevational view of an upper corner of the storage bin and the frame and illustrates the guide rollers for guiding the storage bin;

FIG. 10 is a fragmentary plan view illustrating a guide line connecting the storage bin with the frame;

FIG. 11 is a fragmentary cross sectional view illustrating two concentric pipes with the inner pipe for conveying a gaseous mixture of the finely comminuted solid, with the outer pipe for conveying air, and with a burner head attached to the end of the inner pipe.

Figure 17:
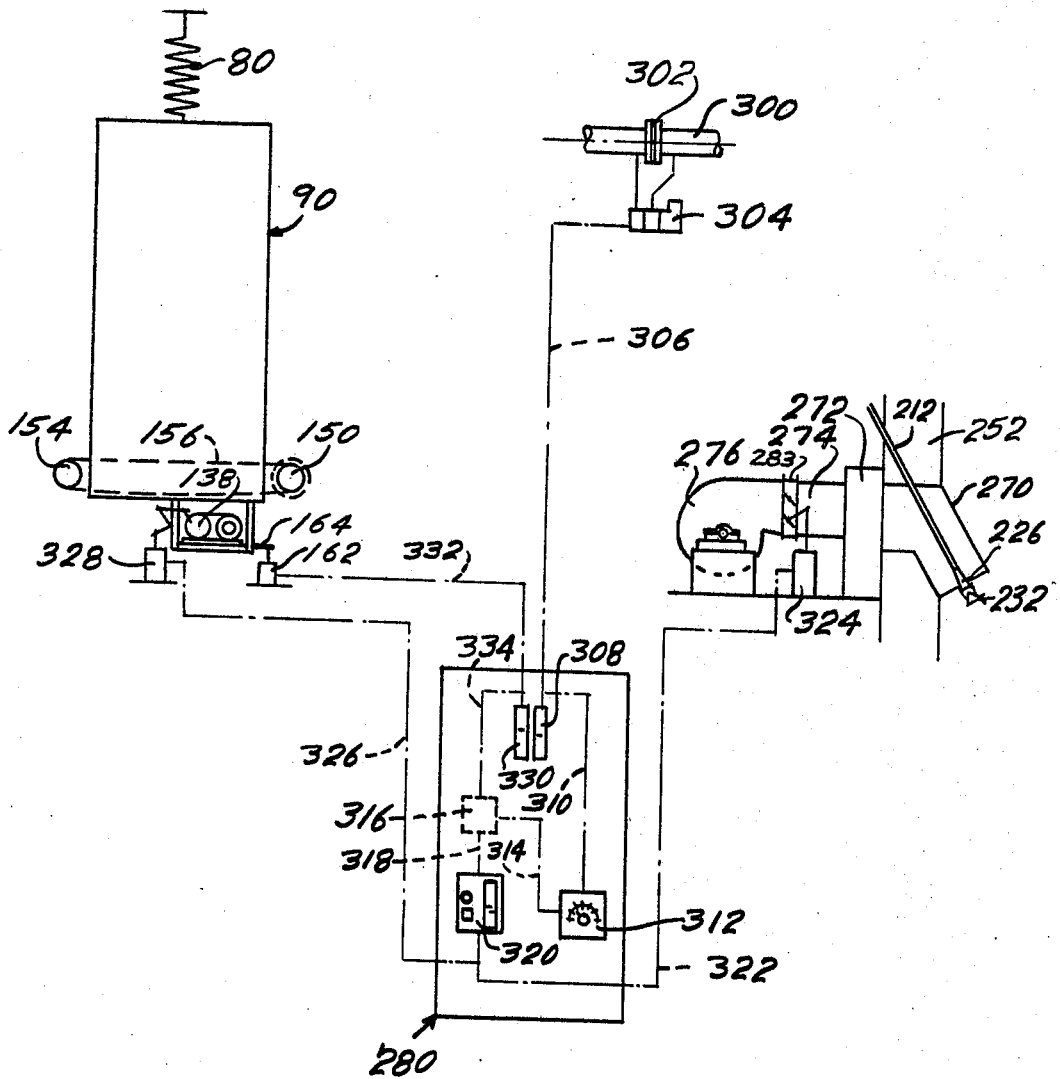
Figure 18:
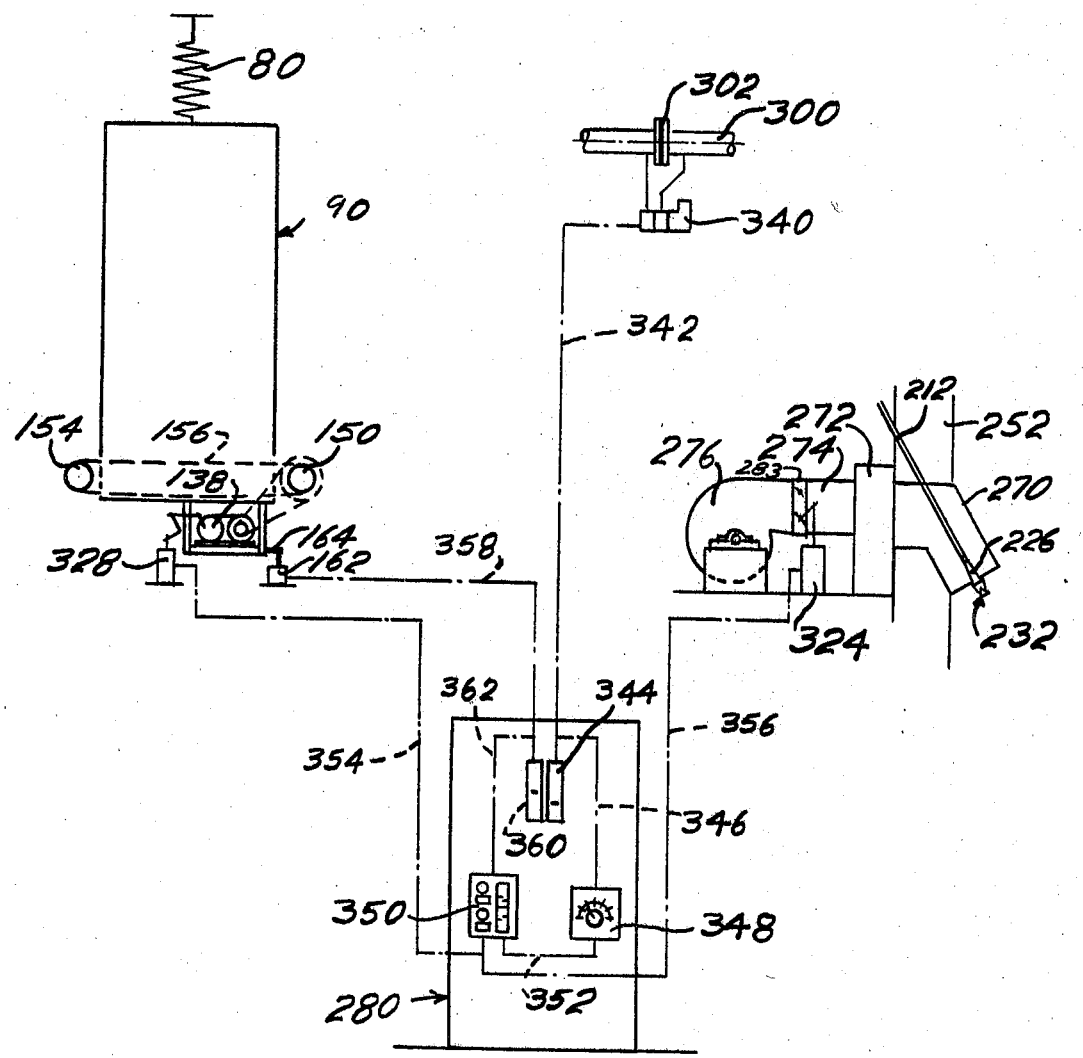
Figure 31:
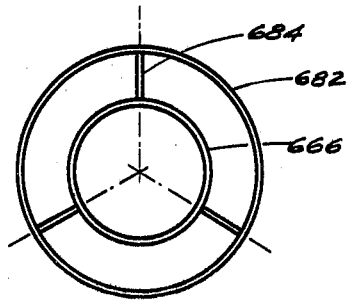
Figure 32:
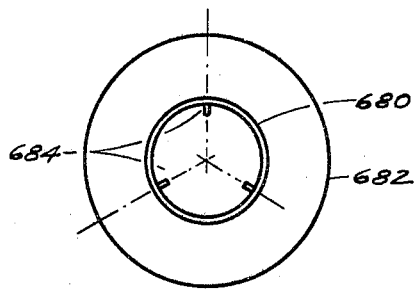
Figure 30:
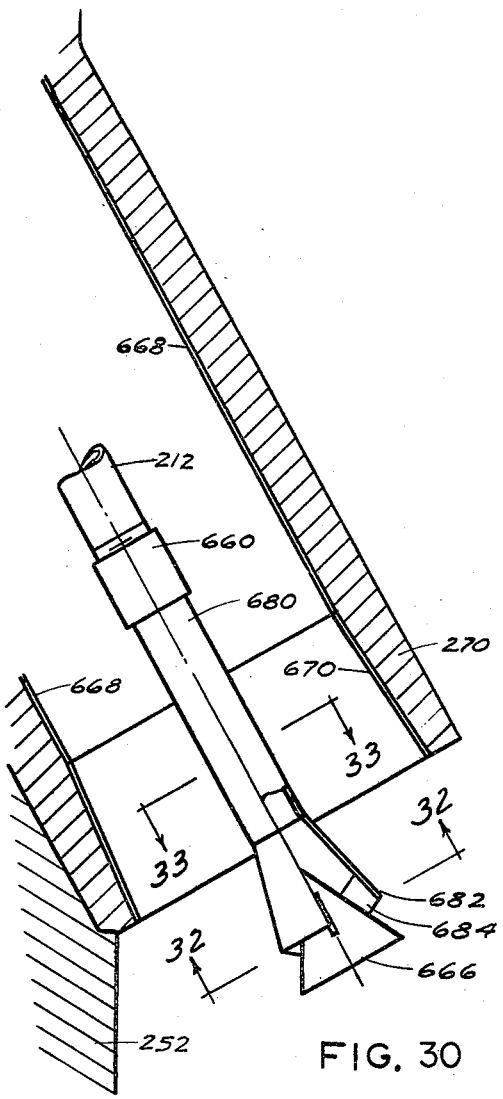
Figure 33:
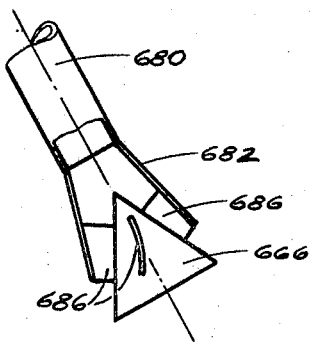

FIG. 12, taken on line 12—12 of FIG. 11, is a lateral cross-sectional view and illustrates the construction of the burner head;

FIG. 13 is a view looking into the end of the burner head;

FIG. 14 is a fragmentary cross-sectional view of another embodiment of the burner head and illustrates an inner concentric tube for conveying a gaseous mixture of the finely comminuted solid and an outer concentric tube for conveying air with the burner head attached to the end of the inner tube;

FIG. 15, taken on line 15—15 of FIG. 14, is a lateral cross-sectional view of the burner head and the tubes connecting the burner head to the inner concentric tubes;

FIG. 16 is an end view looking into the burner head and illustrates the three self-cooled tubes used to support the burner head;

FIG. 17 is a schematic view showing a pneumatic control system for controlling the flow of finely comminuted combustible solid to the furnace and from the storage bin either in response to the steam flow or at a pre-selected fixed rate;

FIG. 18 is a schematic view of an electrical control system for controlling the flow of the finely comminuted combustible solid to the burner head and from the storage bin either in response to the steam flow or at a pre-selected fixed rate;

FIG. 19 is a schematic view of the invention for suspension firing of comminuted hog fuel and for suspension firing of finely comminuted sander dust to afterburn the combustion products of the burned hog fuel;

FIG. 20 is a schematic illustration of another system for burning both sander dust and comminuted hog fuel in the furnace proper and in which furnace the comminuted hog fuel is burned in an air suspension;

FIG. 21, taken on line 21—21 of FIG. 20, illustrates the air control system for introducing air and the sander dust and the comminuted hog fuel into the furnace;

FIG. 22 is a longitudinal vertical cross-sectional view of a pressurized type of a packaged boiler, with burners arranged to burn a finely comminuted solid such as sander dust or finely ground hog fuel in conjunction with a gaseous fuel;

FIG. 23 is an end view of the burner head of FIGS. 22 and 24;

FIG. 24, on an enlarged scale, illustrates the burner assembly used with said packaged boiler;

FIG. 25 is a fragmentary view of the ends of the concentric conveying tubes with the larger tube for conveying air and with the smaller tube for conveying a mixture of fuel and air and with the burner head attached to and juxtapositioned to the end of the smaller tube;

FIG. 26 taken on line 26—26 of FIG. 25, is a lateral cross-sectional view of the smaller tube looking toward the burner head;

FIG. 27 is a fragmentary view of the ends of the concentric conveying tubes with the larger tube for conveying air and with the smaller tube for conveying a mixture of fuel and air and with the burner head attached to and juxtapositioned to the end of the larger tube;

FIG. 28 is a fragmentary view illustrating the connection of the larger tube to an arm which partially supports the burner head;

FIG. 29, taken on line 29—29 of FIG. 25, is a view looking into the burner head and the two concentric tubes;

FIG. 30 is a fragmentary view of the ends of the concentric conveying tubes with the larger tube for conveying air and with the smaller tube for conveying a mixture of fuel and air and illustrates another way for attaching the burner head and near the end of the smaller tube;

FIG. 31, taken on line 32—32 of FIG. 31, is a lateral cross-sectional view of the burner head and the end of the smaller tube and looking into the smaller tube;

FIG. 32, taken on line 33—33 of FIG. 31, is a lateral cross-sectional view of the smaller tube and looking toward the burner head; and, FIG. 33 is a fragmentary view of the end of the smaller tube and the burner head with part of the smaller tube removed to illustrate connection of the smaller tube and the burner head.

In FIGURE 1 there is a schematic illustration of the invention and the furnace in which the invention may be used. For example, there is illustrated a surge bin 90. The surge bin support structure 30 is comprising of upright supports. The upright supports may be I-members, H-members, or other suitable members. The upper ends of the upright supports 32 and 38, see FIGS. 2, 3, and 4, are connected by a beam 40. The upright supports 32 and 34 are connected by a beam 44. The upright supports 36 and 38 are connected by a beam 46. On the beam 44 there are positioned two spaced-apart upright supports 48 and 50. On the beam 46, there are positioned two spaced apart upright supports 52 and 54. The upper ends of the upright supports 48 and 52 are connected by beam 56. The upper ends of the upright supports 50 and 54 are connected by a beam 58. The upper end of the upright supports 48 and 50 are connected by the beam 60. The upper ends of the upright supports 52 and 54 are connected by a beam 62. As is seen in FIG. 2, a diagonal support 64 connects at its upper end with the upright support 48 and the beam 56 and is directed downwardly and inwardly between the beams 40, 42, 44, and 46. Similarly, a diagonal support 66 at its upper end connects with the upper end of the upright support 52 and the beam 56 and is directed downwardly and inwardly toward the center between the beams 40, 42, 44, and 46. Attached to the upper end of the upright support 50 and the beam 58 is a support similar to the support 64, and attached to the upper end of the upright support 54 and the beam 58 is a diagonal support similar to support 66. These diagonal support members and the aforedescribed vertical and horizontal members provide a rigid frame, laterally braced, for support of the two cyclone separators 102 and 104. A housing 68, comprising an upright cylindrical case is supported by a lower platform 70 with a central passageway. The lower platform 70 rests on two U-channel members 72 and 74. These U-channel members 72 and 74 connect with the beams 40 and 42. In the cylindrical housing 68 there is a spring 76. The lower end of this spring 76 is contained in the housing 68. The upper end of the spring 76 connects with a support rod 78 through nut 80 and washer 81. The support rod 78 extends through the passageway in lower platform 70 and below the U-channel members 72 and 74, and also, below the beams 40 and 42.

In the framework is positioned a substantially closed floating storage bin 90 having sides 92 and ends 94. On the upper end of the sides 92 and 94 is a cover or top 96. The ends 94 are vertically disposed, but the sides 92 slope downwardly and inwardly to form a hopper having sides 98 and ends 100. It is shown that, on the upper end of the storage bin 90, there are two cyclone separators 102 and 104. These separators connect with openings in the cover 96 through a flexible canvas seal so as to impose no weight on the cover 96. Also, it is seen that, in the upper part of the storage bin 90, there are two lateral beams 106. The beams 106 are in the storage bin 90 and connect to the sides 92 of the storage bin 90. Also, support rod 78 projects below the lower ends of the beams 106 and has a nut and washer on its lower end. The beams 106 and, therefore, the storage bin 90, are carried by the support rod 78, the waster 107 and the nut 108. The lower portion of the ends 100 of the hopper straighten out vertically and project into a dispensing or feeding region with a removable cover 110 on the dispensing end and a closure piece 112 on the rear end. The cover 110 connects with a transition hopper 116 having an upper end 118 and a sloping side 120. Also, member 114 connects with a bottom 122 which connects with transition hopper 116 at the side 124 of the hopper. Also, the member 110 and the member 98 connect with sides 126 which in turn, connect with the sides 128 of the transition hopper 116, and with the bottom 122. The sides of the hopper 128, 120 and 124 connect to dispensing spout 130.

In FIGS. 1, 2, and 3, it is seen that there is a frame suspended from the lower end of the storage bin 90 and, more particularly, from the sides 126. It is seen that there are four spaced-apart supports 134 which connect with the sides 126 and which are suspended from the sides 126. These four spaced-apart supports 134 support a ledge 136. The ledge 136 supports an electric motor 138 which connects integrally with a gearbox 140. The gearbox 140 has an output shaft 142. On the output shaft 142 is a sprocket 144. In the upper part of the transition hopper 116 there is positioned a shaft 146 having a sprocket 148 thereon. A chain 150 connects the sprockets 144 and 148 so that the sprocket 144 is in a driving relationship with the sprocket 148. The shaft 146 is in a driving relationship with drag chain sprockets 150. In that portion of the storage bin 90 near the part 112, there is positioned a shaft 152 which mounts traction wheels 154. Endless drag chains 156 run around the sprockets 150 and traction wheels 154. It is seen that, by running the chains 156 so that the upper part of the chains move from the traction wheels 154 to the sprockets 150, the finely comminuted solid in the storage bin 90 moves toward the transition hopper 116. In this particular embodiment it is possible to reverse the movement of the chains 156 so that they move from the sprockets 150 toward the traction wheels 154 so that the material in the storage bin 90 can be unloaded through the removable end 114.

The bin, chain, transition hopper and drive are all supported by the spring 76 atop the structural framework, it being precompressed in its initial position to equal the weight of these. The use of the roller guides at the top of the bin, and horizontal guide members at the bottom, permit the bin to move up and down freely without binding and virtually without friction, the amount of movement being about an inch for each 1200 pounds of dust stored.

It is seen that there is a ledge 160 attached to the inner side of the upright support 32. Mounted on the ledge 160 is a bin level sensing transmitter 162. On the lower end of the supports 134 or the ledge 136 is a finger 164. The transmitter establishes a pneumatic or electronic signal directly proportional to the position of the finger and any movement of the bin causes a proportionate change in this signal. By transmission of the signal to indicator 330 or 360, FIGS. 17 and 18, a remote and visual indication of dust contained in the bin is obtained.

Inside of the bin and attached to the end 100 of the hopper is a doctor 166 or a measuring plate 166. This measuring plate 166 may be attached by means of a nut-and-bolt arrangement 101 to the end 100, see FIGS. 6 and 7. It is seen that it is possible to vary the elevation of the doctor 166 with respect to the endless chain 156 so as to gauge the amount of material being carried by the endless chain 156 to the transition hopper 116.

The storage bin 90 is guided inside of the frame by means of rollers and bearing plates. In FIGS. 8 and 9 it is seen that the corner of 92 and 94 has a bearing plate 168. On the inside of the upright H-support 32, there is a housing 170 secured to a mounting plate 162. These support the shaft 178 on which is mounted the roller 176. The roller 176 is set about $\frac{1}{16}''$ away from that portion of the bearing plate 168 on the side 94. Also, mounted on the upright H-support 32 is a housing 178 having a mounting member 180 for mounting a roller 182. A bolt or shaft 184 mounts the roller 182. It is seen that the roller 182 also sets about $\frac{1}{16}''$ away from that portion of the bearing plate 168 which is on the side 92. It is to be realized that this arrangement of a bearing plate 168, rollers 176 and 182 is repeated at the upper part of storage bin 90, i.e. four corners of storage bin 90. In addition to the guide rollers 176 and 182, there are guide lines or struts at the lower end of the storage bin 90 and near the sides 126. More particularly, see FIGS. 5 and 10, where is in shown that on the upright H-support 34 there is a catch 186 and on the side 126 there is a catch 188, these being formed from round rod. A rod 190, one end of which is formed into an eye, connects with the catch 186 and a turnbuckle 192. A similar rod 194 connects with the catch 188 and with the turnbuckle 192. Connection between catch and eye of rod is made by "looping" catch 186 through the eye of rod 190, and catch 188 through the eye of rod 194. By means of the turnbuckle 192, the rods may be adjusted to the length necessary to properly position the lower end of storage bin 90. In FIG. 5 it is seen that there are four such positioning assemblies for positioning the lower end of the storage bin 90. From this it is seen that the upper end of the storage bin 90 is positioned by means of the rollers and bearing plates and that the lower end of the storage bin 90 is positioned by means of the guide lines or struts. The catches are so placed that rods 190 and 194 and turnbuckle 192 will be in a horizontal position when the bin is at the midpoint of its vertical travel. Furthermore, catch 188 is so located that the length of strut, between catch 188 and 186, is of sufficient length to cause the horizontal projection of the strut to be only $\frac{1}{16}''$ less than its true length when the bin is in either maximum position of travel. Thus, it is seen that by adjusting the rods "finger tight" in either maximum bin position, a small, but insignificant amount of play will be developed in the strut in any bin position other than maximum. By using struts to guide the bottom of the bin, any vertical component of the friction between rod 194 and catch 188, and between rod 190 and catch 186, is reduced by the ratio of strut length to half the diameter of the rod used in fabricating the catch. This is in the ratio of 200 to 1 and for all practical purposes, negates the effect of friction in the bottom guides when the bin moves.

Friction in the upper guides is minimized by use of rollers with anti-friction bearings, and by using relatively large diameter rollers in relationship to the diameter of the bearings. Thus, it is seen that the storage bin 90 is suspended from the upper part of the framework by means of the support rod 78 and the spring 76 and is free to move vertically, virtually without friction, within the framework of the upright support H-member 32, 34, 36, and 38. Having eliminated, for all practical purposes, any influence from friction in the bin guiding system, the signal from the bin level transmitter becomes responsive only to the weight of stored material in the bin irrespective of bin position or direction of travel.

The lower end, or funnel 130, of the transition hopper projects into an adaptor frame 200 mounted on the feeder 204. The funnel 130 does not connect directly with the adaptor 200, but fits inside of this adaptor, A flexible sleeve 202 connects with the upper outside wall of the funnel 130 and, also, connects with the upper part of the adaptor 200. This sleeve 202 may be of canvas or other flexible material and closes the connection between the funnel 130 and the adaptor 200, but is not a rigid connection between the funnel 130 and the adaptor 200. The adaptor 200 connects with feeder housing 204. The feeder consists of a rotating valve, arranged to move material into the higher pressure conveyor system from the lower pressure transition hopper 116, as rapidly as it is received from the unloading chain. It is seen that there is a motor 206 which connects by means of sprockets and a chain 208 with the valve shaft. The valve shaft leads inside of the feeder housing 204. The feeder housing 204 connects with an adaptor 210. The outlet of the adaptor 210 connects with a pipe 212. In this particular installation, the pipe 212 is a three-inch pipe. There is another inlet 214 to the adaptor 210. It is seen that there is an inlet from the feeder housand 204 and, also, the inlet 214 of the adaptor 210 and the outlet 212. The inlet 214 is a pipe which connects with an air blower 216. The blower 216 is driven by an electric motor and suitable chain or belt drive 220. The air blower 216 and the electric motor 218 are mounted on the pedestal 222. The finely comminuted solid from the surge bin 30 is forced through the three-inch pipe 212 at a velocity of about 5000 feet per minute. The make-up of the material in the pipe 212 is a mixture of finely comminuted solid and air or gaseous fluid. The ratio is approximately 237 cubic feet per minute of air and from 0.5 to 4.0 cubic feet per minute of the finely comminuted combustible solid, the amount depending on chain speed, i.e., a ratio of the air or gaseous fluid to solid in the range of about 55 cubic feet of said gaseous fluid or air to one cubic foot of said solid to approximately 475 cubic feet of said air or gaseous fluid to one cubic foot of said solid. The high concentration of the finely comminuted combustible solid in the air plus the cooling effect of secondary combustion air at entry to the furnace combine to provide an atmosphere such that combustion is not supported. This was proven in actual practice by turning off the air blower 216 to see if there would be a flash back in the conveying tube 212 and, therefore, no support of the combustion in the conveying tube 212.

The conveying pipe 212 connects with a nozzle 226. In FIG. 11 is is seen that, on the end of the pipe 212, there is welded a collar 228 which is internally threaded. The nozzle 226 is externally threaded and screws into the collar 228. On the end of the nozzle 226 there are welded three hollow tubes 230. These tubes 230 are welded to the outside perimeter of the nozzle 226 so that the tubes receive a gas or air outside of the nozzle 226. The tubes 230, upon leaving the nozzle 226, are directed inwardly toward each other and connect with a burner head 232. The burner head 232 is in the configuration of a cone with the apex of the cone pointing toward the nozzle 226. In the burner head 232 are three passageways 234 for receiving the three hollow tubes 230. The tubes 230 project through these passageways 234 and on the end of the tubes inside of the burner head 232 there is a bead 236 or an enlargement so that the burner head cannot be pushed over the ends of the tubes. The burner head 232 may be comprised of a ceramic material 238 facing the nozzle 226 and a stainless steel mesh 240 on the inside. It could also be comprised of stainless steel or could be cast of type HS Mechanite ductile iron; exact material to be determined by economic considerations. From experience with ceramic heads it has been found desirable to have the stainless steel mesh screen so as to give stability to the burner head 232, and also to positively attach the tubes 230 to the burner head by means of attaching the tubes 230 to the stainless steel mesh screen 240.

In FIG. 1 it is seen that the burner head 232 and the pipe 212 project into a furnace 242. The furnace has a floor or base 244, a back wall 246 and a front wall 248 which is also the back wall for a Dutch oven 250. The furnace also has an upper front wall 252, a boiler drum 254 and a baffle 256 for directing flue gas out of the chimney 258. Of course, there are the other accessory units such as the tubes and the housing for generating the steam in the boiler drum 254. The Dutch oven 250 has a front wall 260, a roof 262, and an opening 264 which leads from the Dutch oven to the furnace 242. At the opening 264, between the Dutch oven and the furnace, the roof structure 266 slopes downwardly going from the Dutch oven 250 to the furnace 242. This is to direct the heat and flames from the Dutch oven downwardly toward the base 244 of the furnace 242. In the front wall of the furnace 252 there is an opening 268. The pipe 212 projects through this opening 268, and also a large housing 270 projects through this opening 268. The housing 270 connects with an adaptor 272. The adaptor 272 connects with suitable ductwork 274 which, in turn, connects with a forced draft fan 276. The draft fan 276 is driven by means of an electric motor 278 either direct-connected or through a V-belt drive as shown. As is illustrated in FIG. 1, the electric motor, forced draft fan 276, ductwork 274 and adaptor 272 are mounted on top of the Dutch oven 250. In this particular installation, this is a convenient place to mount this source of secondary air. However, it is to be realized that in another installation, it may be appropriate to mount these sources of secondary air in another location.

Maximum firing rate is established by maximum speed of the bin unloading chain and requires about 4000 c.f.m. of air for optimum combustion, whereas about 600 c.f.m. of air is required at minimum chain speed or minimum firing rate. Since the air needed to convey the dust to the furnace is the aforementioned 237 c.f.m., it can be seen that the difference, or approximately 400 c.f.m. and 3800 c.f.m. of combustion air will need to be supplied by the force draft fan and dampening system at minimum and maximum firing rates respectively. The damper 283 is automatically positioned to provide these minimum and maximum quantities, or any intermediate quantity as determined by unloading chain speed. This is in contrast to the usual system for firing sander dust wherein the dust is introduced intermittently as produced in the manufacturing process, and here the low-velocity air system employed to introduce it is also the air for combustion. Since this air cannot be regulated without impairing conveying capability, it is obvious that an incidence of good combustion is no more than a statistical phenomenon and explains why such installations are inefficient, hazardous, and heavy contributors to atmospheric pollution.

As previously stated, the finely comminuted combustile solid is conveyed through the tube 212 to the burner head 232 whereupon hitting the burner head it is spread apart, and simultaneously mixed and burned in the enveloping combustion air delivered through refractory duct 270. This air is provided by means of the forced draft fan 276 and is delivered through suitable ductwork to the refractory duct 270 inside of the furnace. The finely comminuted solid and air hit the burner head 232 and are scattered. Then, the secondary air mixes with the finely comminuted combustible solid, and the solid ignites instantaneously and burns so rapidly that there appears to be a small explosion. The rapid or quick burning of the finely comminuted combustible solid is partially a result of the large surface area of the solid in proportion to its volume. The temperature in the vicinity of the burner head 232 is held at approximately 1600° F. During startup, however, the system was inadvertently overfired and the end of a 2600° F. thermocouple protecting tube burned off. Despite this abuse, the burner head and self-cooled burner support tubes remained intact and undamaged. With such high temperature it is seen that there must be means provided for cooling the burner head and its supports. The means for cooling the burner head is the nozzle 226 directing the gaseous mixture of the air and a finely comminuted combustible solid against the burner head 232. The air in this gaseous mixture assists in cooling the burner head 232. The means for cooling the burner head supports, comprised of three hollow tubes 230, is seen to be their connection directly with the source of secondary air in the housing 270. This source of secondary air in the housing 270, besides providing air for combustion of the finely comminuted combustible solid, also functions as a cooling medium. By cooling the hollow burner support tubes 230, some cooling of the burner head 232 is effected in addition to that provided by the dust-air mixture. Finally, the source of secondary air in the housing 270 cools the burner head 232 as some of this air strikes the burner head 232. These means of cooling the burner head 232 have done a sufficiently good job of cooling so that it was possible to obtain six months' service from a recently installed burner head before replacement.

In FIG. 1 it is seen that, on the top of the Dutch oven 250, there is a control panel 285.

In FIG. 14 there is shown another burner head 282. It is seen that this burner head is also in the configuration of a cone with the apex of the cone directed toward the opening of the nozzle 226. The burner head 282 has side walls 284. In the side walls 284 there are three passageways 286. Hollow tubes 288 pass through these passageways 286. These tubes 288 meet at the large end or in the center of the cone and are welded or brazed together at 290 so as to make a rigid structure. The other end of the tubes 288 are attached to the periphery of the nozzle 226 at 292. From this it is seen that the burner head 282 is firmly positioned on the three tubes 288 so that the burner head cannot slide off the three tubes 288. Again, it is seen that the three tubes 288 are directed to the air stream of secondary air in the housing 270 so as to be self-cooled and provide some cooling for the burner head 282. To be explicit, the three tubes 288 connect with the secondary air stream in the housing 270 or open in the housing 270 and do not open in the nozzle 226; although, again, these tubes are attached to the outer surface of the perimeter of the nozzle 226.

There are provided controls for regulating the amount of finely comminuted combustible solid introduced through the pipe 212 and to the burner head 232 in the furnace; for automatically regulating the combustion air delivered through refractory tube 270 in accordance with the amount of finely comminuted combustible solid introduced; and for measuring and indicating the amount of steam generated in the boiler drum 254. From the boiler drum 254, the steam flows through a steam line 300. In the steam line 300 there is a metering element such as an orifice plate 302. Pipe or tubing, connected into steam line 300 on either side of orifice place 302, permit the steam flow transmitter 304 to sense the pressure differential across the orifice plate and to convert this differential into a pneumatic signal proportional to the flow of steam in line 300. In FIG. 17 there is illustrated a pneumatic control system. The steam flow transmitted 304, by means of a pneumatic line 306, connects with a steam flow indicator 308. The line 306 also connects with a line 310. The line 310 leads to a ratio relay primary control 312. The primary control 312, by means of a pneumatic line 314, connects with a cut-back relay 316. The cut-back relay 316, by means of a line 318, connects with a control station 320. The control station 320 connects by means of a line 322 with a regulator 324 for the damper 283 in the forced draft discharge duct as shown, or to a regulator for control of variable inlet vanes in the forced draft fan inlet, the air being fed to the furnace through the refractory duct 270. Also, the control station 320, by means of line 326, connects with the control 328 which varies the speed of the electric motor and this varies the speed of the unloading chain which delivers the finely comminuted solid from the surge bin 90 to the transition hopper from whence the feeder 204 introduces it into pipe 212 and the furnace 242. Further, the bin level sensing transmitter 162 connects with the bin level indicator 330 by means of a pneumatic line 332. Further, the bin level sensing indicator connects with the cut-back relay 316 by means of a line 334.

In operation the operator may set the primary control 312 so that the furnace is fired by any proportion of finely comminuted combustible solid introduced into the furnace through the tube 212 and the nozzle 226. For example, if set to produce 60% of the steam by firing a finely comminuted combustible solid, then the relay 312 would multiply the signal received in the line 310 from a transmitter 304 by 60% and send this signal to the relay 316 via line 314. For example, if a pneumatic signal of 15 p.s.i.g. represented a maximum steam flow of 50,000 pounds per hour (p.p.h.), and a signal of 3 p.s.i.g. represented a steam flow of zero p.p.h., then the relay would multiply the effective signal of 12 p.s.i.g. (15—3) by 60% and add the resulting 7.2 p.s.i.g. signal to the 3 p.s.i.g. to send a 10.2 p.s.i.g. signal through line 314 to relay 316. If the bin were more than 10% full, no further change would occur in this signal and it would be transmitted through control station 320 simultaneously to unloading chain controller 328 through line 326, and to forced draft fan damper controller 324 through line 322. Thus, is it seen that when generating 50,000 p.p.h. of steam with ratio controller set at 60%, 30,000 p.p.h. of that steam is generated by a finely comminuted combustible solid and the remaining 40%, or 20,000 p.p.h. is generated by the fuel fired in the Dutch oven. Also, if the steam flow should drop below the maximum value of 50,000 p.p.h., for example to 40,000 p.p.h., then the signal pressure in line 306 from flow transmitter 304 would drop to 12.6 p.s.i.g. and the signal pressure in line 314 from ratio relay 312 would drop to 8.76 p.s.i.g. This signal, when sent to controller 328 through line 326 and to controller 324 through line 322, would cause a downward adjustment in the rate at which fuel and air were introduced into furnace 242 so as to produce 24,000 p.p.h. of steam, which, it is seen, is exactly 60% of 40,000 p.p.h.

When the firing rate of the finely comminuted combustible solid is in excess of the rate at which it is produced, the quantity of it stored in the bin is reduced. When the stored quantity reaches 10% of the quantity capable of being stored, the air pressure in the line 314 from ratio controller 312 is reduced by cut-back relay 316 under the influence of the signal in line 334 received from the bin level transmitter 162. The influence causing the signal reduction is proportional to the amount of actual quantity stored in the bin is exceeded by 10% of the quantity capable of being stored. Conversely, if the finely comminuted combustible solid enters the bin at a faster rate than it is being consumed in the furnace, the influence of the cut-back relay 316 diminishes until the quantity stored reaches 10% of the total quantity capable of being stored in the bin. At any stored quantity in excess of 10%, the influence of 316 is negated and firing of the finely comminuted combustible solid is controlled by the signal established by ratio controller 312 in a pre-selected proportion or ratio to steam flow as measured and transmitted by flow element 302 and transmitter 304.

Control station 320 gives a visual indication of the value of the pneumatic pressure signal being transmitted to controller 328 and controller 324. In addition it permits the plant operator to switch from "automatic" to "hand" position, and when set in the latter position, enables him to position controllers 328 and 324 with any selected pressure desired within the aforementioned range of 3 p.s.i.g. to 15 p.s.i.g. When so positioned, the signal from ratio controller 312 and the signal from cut-back relay 316 are negated and the finely comminuted combustible solid will be fired at a fixed or constant rate until the setting at the control station 320 is changed, or until the bin is emptied of its contents.

It is understood that all values used in the foregoing were selected to aid in described control functions; that values in an actual installation might vary somewhat from those used depending on the actual control system installed, or on the particular objectives sought.

From the foregoing description, it is seen that the invention of being able to store and measure a finely comminuted combustible solid in a bin is significant and important in that it not only enables the plant operator, at a remote location in a boiler plant, to read at a glance on bin level indicator 334, the quantity of material stored in the bin, but also, enables the signal from bin level transmitter 162 to be sent through line 334 to cut-back relay 316, and to thereby monitor the signal from ratio relay 312 so as to prevent the bin from being emptied completely as would happen should the firing rate, as established by the signal from relay 213, be in excess of the bin fill rate for a sufficienaly long period of time.

In addition to the penumatic controls illustrated in FIG. 17, it is also possible to use electrical controls as illustrated in FIG. 18. Again, there is a steam flow line 300 and the metering element 302. There is an electrical steam flow transmitter 340 which is actuated by means of the pressure differentials developed across metering element 302. The transmitter 340, by means of line 342, sends a signal to the steam flow indicator 344. Also, the line 344, by means of line 346, connects with the ratio relay primary control 348. Control 348 connects with control station 350 by means of line 352. The control station 350, by means of line 354, connects with the control 328 for controlling the feed from the surge bin 90. Further, the control station 350 by means of line 356, connects with the control 324 for controlling the combustion air fed to the furnace through the housing 270. The bin level sensing indicator 162, by means of line 358, connects with the bin level indicator 360. Further, the line 358, by means of line 362, connects with the control station 350. The operation of the electrical controls of FIG. 18 is similar to the operation of the pneumatic controls of FIG. 17 except that the functions performed by cut-back relay 316 are incorporated in relays built into control station 350. For example, an operator may set the ratio relay primary control 348 so that approximately sixty percent (60%) of the fuel is finely comminuted combustible solid from the surge bin 90 and forty percent (40%) of the fuel is from hog fuel or other fuels in the Dutch oven 250. The control 348 then reduces by 40% the signal received from steam flow transmitter 340, sending on the 60% of the signal remaining to the control station 350. The control station 350 sends the signal simultaneously to the fuel control 328 and to the combustion air control 324. If at this setting of the control 348, and if the bin is at least 10% full, 30,000 p.p.h. or 60% of a total steam flow of 50,000 p.p.h. would be produced by a finely comminuted combustible solid in the bin and the remaining 20,000 p.p.h. or 40% would be produced by the hog fuel or other solid fuel in the Dutch oven. However, if the bin is les than 10% full, the signal from bin level transmitter 162 actuates a relay in the control station 350 so as to reduce the signal sent simultaneously to the control 348. The amount of signal reduction is inversely proportional to the amount of fuel in the bin. The effect is to increase the fuel in the bin until the 10% level is restored. Above 10%, the influence of the cut-back relay in the control station 350 is negated and signal send out to control 324 and control 328 once again becomes proportional to the signal from steam flow transmitter 340 in accordance with the ratio preselected at the ratio control 348 by the plant operator.

Control station 350 gives a visual indication of the value of the electronic signal being transmitted to controller 324 and controller 328. In addition, it permits the plant operator to switch from "automatic" to "hand" position; and, when set in the latter position, enables him to position controller 324 and controller 328 with an selected signal desired when the minimum and maximum firing rates preset into the control system. When so positioned, the signal from ratio controller 348 is negated as is any signal influence from the cut-back relay in control station 350, and the finely comminuted combustible solid will be fired at a fixed or constant rate until the setting at control station 350 is changed, or until the bin is emptied of its contents.

The finely comminuted combustible solid used in this apparatus and this process of combustion is sander dust from a plywood mill. As previously explained, in finishing plywood, the exposed veneer is sanded to give a smooth pleasing finish. The sander dust is dry, is of variable particle size of up to 0.012", but consists mostly of "fines" with some "stringy" rectangular shaped particles which are torn from the panel surface during the initial or coarse grinding operation. The material is "spongy," quite compressible, and possesses extremely poor "flowing" characteristics resulting in a strong tendency to "hand up" on the sides of the bin and to "bridge over" when the atmosphere is slightly damp. The dust is usually transported or conveyed by blowing it through pipes or ducts using air or inert gas for the conveying media. Separation of the dust from the conveying media is effected at the point of delivery in a centrifugal type of separating device known as a cyclone. By admitting the dust tangentially into the cyclone, it is made to spin rapidly, with the heavier dust particles being thrown to the outside, thus concentrating the lighter or gas conveying media toward the center, permitting escapement thereof out the duct atop the unit. Such a cyclone 104 with a portion of the incoming conveying pipe 394 is shown atop the storage bin in FIG. 1.

In an effort to determine the applicability of the conveyor-burner system for firing other types of fuel, the variable speed chain unloading drive 140 was shut down and three different fuels were individually and separately fed manually into conveying pipe 212 via adaptor piece 210 by moving the cover piece atop the feeder transition hopper and dropping the material onto the rotating vanes of feeder 204. The fuels consisted of sawdust, ground waste paper, and ground hog fuel.

The sawdust, a dry and fairly coarse material, was fired by transporting at high velocity through line 212 into furnace 242 where burning began immediately upon coming into contact with impingement cone 232. Although much coarser than the sander dust, no visible difference could be detected in the flame pattern when firing this sawdust and when firing sander dust. Appearance of flame was clean with no evidence of smoke or carryover pollution from unburned combustible particles.

The ground waste paper was obtained by grinding in a mannermill of the type shown as item 380 in FIG. 1. The material passed through a $\frac{5}{16}$" screen in the grinder and this is the maximum size of particle fired. The paper tended to "fluff up" in the grinding process giving it an extremely poor "flowing" characteristic. As a consequence, it tended to hang up on the sides of the transition hopper and to bridge across the rotating feeder element causing the rate of feed to adaptor piece 210 to be erratic and non-uniform. Even so, the material was transported at high velocity without difficulty through line 212 into furnace 242 where firing began immediately upon the ground paper coming in contact with impingement cone 232. Again, no visible difference could be detected in the flame pattern when firing this ground waste paper and when firing sander dust. Appearance of the flame was clean with no evidence of smoke or carryover pollution from unburned combustible particles.

The ground hog fuel was obtained by grinding in a hammermill of the type shown as item 380 in FIG. 1.

The material passed through a ⁵⁄₁₆" screen in the grinder and this is the maximum size of particle fired. Hog fuel is a wood waste material accumulated from the manufacture of plywood and other wood products and represents that portion of wood and bark which cannot be used economically in the making of other products, such as hardboard, particle board, chipcore, pulp, or mulch. The material was fed into conveying pipe 212 at a uniform rate by feeder 204 via adaptor piece 210. The material was transported at high velocity without difficulty through line 212 into furnace 242 where burning began upon approaching impingement cone 232. Because no visible difference could be detected in the flame pattern when firing this ground hog fuel and when firing sander dust, it can be assumed that hog fuel ground to this size can be successfully fired in suspension.

Even though the three fuels tested possessed physical characteristics permitting their being fired in suspension in furnace 242 efficiently and cleanly without smoke or the formulation and emission of other pollutants to the atmosphere, there is some doubt that either the ground hog fuel, because of the usual moisture content contained therein, or the ground waste paper, because of its tendency to "fluff up," could be stored in bin 90 with the sander dust and be fed therefrom into line 212 at a controlled variable rate as is being done with sander dust alone. There is little doubt, however, but that dry materials such as sawdust, or ground dry wood waste materials such as planer shavings and various trim materials could be stored and fed from bin 90 simultaneously with the sander dust, or stored and fed individually therefrom, and be conveyed therefrom at high velocity in line 212 to furnace 242 at a variable rate controlled by the speed of unloading chain drive 140, and by the ability of feeder 204 to deliver this material through adaptor piece 210 into conveyor line 212 at this controlled speed without variation, and to be mixed with combustion air and ignited immediately upon entering furnace 242 and there to be totally consumed without formation of smoke or carryover of other unburned combustible pollutants.

In FIG. 1 there is shown an arrangement for sizing other suitable combustible materials and for conveying and discharging these materials into storage bin 90. An impact type grinder or hammermill 380 is shown as being driven by an electric motor, although under certain conditions, this drive might be a steam turbine. As shown, the drive shaft extends through the hammermill to drive a fan 385 with a special material handling wheel. A duct 390 connects the outlet of the hammermill and the inlet of the fan. Under certain conditions, the fan might be driven by a separate motor or turbine drive, or by a belt, chain or gear reducer drive on the end of the shaft. This would occur whenever the required rotational speed of the fan 385 exceeded or was different from that of the hammermill 380. The hammermill 380, the electric motor 382, and fan 385 are mounted on a base or pedestal 384. There is a hopper 386. The fuel is introduced into the hopper 386 by means of an endless belt or chain 388. The small particles of ground fuel are removed from the mill 380 to a conveying pipe 392 by the fan 385 through the connecting duct 390. The conveying pipe 392 connects with the cyclone separator 102. The size of the fuel introduced into the hammermill 380 may vary, the maximum size being limited by the size of the hammermill selected for the particular application. The fuel is beaten in the hammer mill 380 until it is of a sufficient small size to pass through the sizing plates located around the periphery of the hammermill rotor which mounts the multitude of swing hammers used in effecting size reduction. While sizing plates are available in a wide selection of opening sizes, practical economic considerations require that these be as large as possible without comprising the end result of providing a material which can be fired cleanly in furnace 242. As stated, this has been accomplished with various materials ground to a maximum size of ⁵⁄₁₆", but this does not rule out the possibility of successfully firing materials ground to a larger maximum size in the installation now in operation, or in future installations. The finely comminuted fuel is conveyed by means of air through the pipe 392. The finely comminuted fuel is introduced into the floating storage bin 90 and is admixed with the finely comminuted combustible solid or sander dust. Then this mixture is introduced through the pipe 212 into the furnace 242 where it readily burns in suspension. Of course, it is not necessary to mix the finely ground fuel with sander dust prior to firing in order to successfully fire in suspension in furnace 242. Where sander dust is unavailable, the invention described has already demonstrated a capability of firing other finely ground materials in suspension without smoke and without the carryover of combustible pollutants to the atmosphere.

In the Dutch oven 250, there is a grate 398. The hog fuel fed into the Dutch oven 250 and onto the grate 398 is not a finely comminuted hog fuel but is hog fuel of various sizes. For example, the hog fuel may vary in size from splinters to large particles of dust, and to chips such as three or four inches in length and an inch or two inches thick and two or three inches wide. The burning of this hog fuel does not produce as hot a fire or as hot a flame as the burning of the finely comminuted combustible solid introduced through the pipe 212 and the nozzle 226 into the furnace 242. Another way of looking at this is that wood is composed mainly of carbon, hydrogen and oxygen. The finely comminuted combustible solid introduced through the pipe 212 and nozzle 226 in the furnace 242 and which achieves a flame temperature in excess of 2000° F. burns mainly to water and carbon dioxide with very little carbon monoxide and almost no free carbon or resins or tars remainnig. However, with the hog fuel in the Dutch oven 250, furnace temperatures are much lower and the wood cannot and does not burn as completely to carbon dioxide and water, but burns only partially to make carbon monoxide, free carbon, possible carbon black, and to produce tars and resins which coat out on the boiler tubes and even the boiler itself. This relatively low temperature is characteristic of the firing of solid combustibles such as hog fuel on grates. When the temperature is increased by regulating the admission of fuel and air, additional gases are driven off the fuel pile already on the grates. Additional combustion air must then be provided to retain proper ratio of air to fuel, but the additionl air causes a cooling effect which largely negates the temperature increase. If additional air is not provided, the chances of smoking are increased. Consequently, temperatures in the Dutch oven depend more on the type of fuel being fired, especially its moisture content, than it does on the firing technique of the plant operator. In other words, while a poor operation will produce more smoke and pollution from the fuel he fires than will a good operator, there are inherent limitations in the firing of hog fuel on grates in a Dutch oven which make it impossible for the best operator to achieve smokeless and pollution-free combustion. It is necessary to periodically clean the furnace. Prior to installing this burner for the finely comminuted combustible solid, the residents near this plywood mill complained when the furnace tubes were blown. In the blowing of the furnace tubes, the fire is cut back or decreased and steam is introduced into the furnace through specially located nozzles for a few minutes to clean the tubes and to remove tars and resins and carbon black deposited on the tubes. The tars and resins and carbon black are blown up the stack 258 and make a black cloud upon the stack. Now, the residents near the plywood mill complained when the furnace tubes were blown, prior to the installation of this apparatus for burning the finely comminuted combustible solid. After the installation of this apparatus and the blowing of the furnace tubes, it has been noted that there is a very small amount of carbon black and tars and resins blown through the stack 258. This indicates that there not only is a complete combustion of the finely comminuted combustible solid introduced through the nozzle 226 into the furnace 242; it further indicates that, with the hotter flame temperature, the patrially burned products or the partially combusted products from the Dutch oven 250 are more completely burned. This is only logical as the temperatuers produced by burning the finely comminuted combustible solid around the impact cone or burner head 232 are very high in relation to the temperature obtainable in the Dutch oven and when directed downward into the path of incoming gases from the Dutch oven 250, mix therewith, and assist in burning the tars, resins, carbon monoxide and carbon black contained therein. In the present installation at a plywood mill, it has been ascertained that the degree of burnout in the Dutch oven gases depends on the type of fuel being fired in the Dutch oven as well as its amount in relation to the amount of finely comminuted combustible solid being fired in furnace 242. If the latter is in sufficient supply to permit a favorably high setting of ratio controller 312 or 348, the burnout will be virtually complete. Where this ratio is not favorable, of course, pollutants formed in the Dutch oven gases will either settle out on the tubes and floor, or will carry over through the stack and into the atmosphere. On the other hand, prior to making this installation, residents near the plywood mill frequently complained of the fallout of black sooty material from stack 258 when furnace tubes were blown. Since its installation, no complaints have been received which further attests to its success in burning the finely comminuted combustible solid.

Prior to the installation of this apparatus for burning the finely comminuted combustible solid, it has been noticed that that portion of the Dutch oven 250 referred to by reference numeral 266 and which is directed downwardly leading from the Dutch oven 250 to the furnace 242 and which directs the gases from the Dutch oven 250 downwardly into the furnace 242, would burn badly and would have to be replaced more often than the other parts of the Dutch oven. Since the installation of this apparatus for burning the finely comminuted combustible solid, no burning of refractory part 266 has been noticed and it is expected that the life of the refractory part 266 will be longer than previously realized. One of the reasons for this is that the nozzle 226 and the secondary air housing 270 are pointed downwardly and, therefore, force the exhaust gases from the Dutch oven 250 downwardly. This is easily explained as the air pressure is greater up around the stream of air from the nozzle 226 and the housing 270 so as to move these exhaust gases downwardly. Since these exhaust gases are being moved downwardly, they have less contact with the refractory part 266 and there is less burning or decomposition of this refractory part 266.

Further, prior to the installation of the apparatus for burning the finely comminuted combustible solid, there was a collection of dust and ash and the like on the base 244 of the furnace 242. With the downwardly-directed nozzle 226 and the housing 270, the ash and dust has been burned away from the base 244 and the base is clean. This has been noticed during the inspection of the furnace every two weeks. Prior to the installation, the dust on the furnace floor would accumulate over the entire floor to a depth of about 12" whereas now this accumulation has been reduced to a small buildup along each of the furnace sidewalls.

Further, the increase in the boiler output with this apparatus for burning the finely comminuted combustible solid has been notable. For example, the boiler was capable of producing only 35,000 p.p.h. of steam prior to the installation of this invention. With its installation, however, generation in excess of 500,000 p.p.h. of steam is easily achieved. Unfortunately, since no such increase was foreseen, the steam flow indicator 308 or 344 was only calibrated to a maximum flow of 50,000 p.p.h., but recalibration will be made for a flow of 75,000 p.p.h. maximum. In other words, there has been an increase in output capability of the boiler which probably is in excess of 50% with the installation of this apparatus for burning the finely comminuted combustible solid. The explanation for this is that the furnace temperatures can be maintained at a more uniform level and at a higher level. Prior to this installation, the gases from the Dutch oven wiped across the furnace side face of the nose arch 266 in following a natural path of least resistance to the first boiler pass which starts between the end of baffle 255 and boiler drum 253. It can be seen from FIGURE 1 that this leaves a substantial portion of waterwall generating tubes, at the rear and lower part of the furnace, in a relatively cold zone. It is further seen that, by downwardly directing the hot gases from the nozzle 226 and the refractory air housing 270, heat is effectively distributed into this zone with a resulting increase in generation from the tubes located adjacent thereto.

In FIGURE 19 there is schematically illustrated a modification for burning hog fuel and for burning sander dust in an existing Dutch oven fired boiler. FIGURE 19 may be more adequately appreciated with reference to FIGURE 1. In FIGURE 1 there is burned, as is recalled, in the Dutch oven 250 hog fuel varying in size from small splinters, even ground wood, to relatively large pieces of wood and bark such as: two or three inches in length, two or three inches in width and one inch in thickness. The hog fuel is dropped on the grate 398. The gases from the hog fuel in the Dutch oven 250 pass through the opening 264 and underneath the nose arch 266 and into the furnace 242. These gases comprise carbon dioxide, carbon monoxide, water, tars, resins and partially burned wood. The burning of the hog fuel in the Dutch oven 250 may be considered to be a primary combustion or a primary burning. The burning of the sander dust in the furnace 242 may be considered to be an afterburning. As is recalled, the sander dust is suspension fired or is suspension burned in the furnace 242. With the gases from the Dutch oven 250 coming in contact with the sander dust and with the products of the burning of the sander dust in the furnace 242, there is realized a more complete burning of the gases from the Dutch oven 250. A variation of this is illustrated in FIGURE 19 where there is a Dutch oven 420. The furnace 242 is substantially the same in FIGURE 19 as in FIGURE 1. Therefore, like reference numerals will be used. In the Dutch oven 420 there is burned ground hog fuel. The size of this hog fuel may be varied. For example, the hog fuel may be passed through a screen with 5/16" openings, or through a screen with larger or smaller openings as required by the particular application. It is to be realized that this ground hog fuel is suspension fired in the Dutch oven 420. Therefore, it is desirable to have the hog fuel of a sufficiently small size to readily burn while in a gaseous suspension in the Dutch oven 420. The grate 398 is covered by a protective insulating refractory 422. The grates 398 shown in FIGURES 1 and 19 are necessary for firing a solid fuel where particle sizes are too large to permit firing in suspension. The grates offer a convenient means for mixing combustion air and fuel. Specifically, the air is admitted below the grates, then upward through the grates and into the fuel bed covering them. The grates are usually made of cast iron and the insulating effect of the fuel bed plus the cooling effect of the air prevent them from being damaged by the temperatures developed in the burning process. In the arrangement shown in FIGURE 19, it is seen that the combustion air is not admitted through the grates, nor will there be a protective cover of unburned fuel thereon. Therefore, a layer of insulating refractory 422 must be provided for grate protection. In the front of the Dutch oven 420 there is an opening 424. Positioned in this opening 424 is a conveying pipe 428. The conveying pipe 428 connects with the nozzle 226. The nozzle 226, by means of hollow tubes 230, connects with an impact cone or burner head 232. The conveying pipe 428 connects with a blower 430. The blower 430 connects with a hammermill 432 through duct 454. A hopper 434 connects with the hammermill 432. An endless feed belt 436 connects with the hopper 434. An electric motor 438, through suitable mechanical means, drives the hammermill 432 and blower 430. The electric motor 438, the hammermill 432, and blower 430 are positioned on a pedestal 440. The air for the Dutch oven 430 is supplied through a windbox 442 which connects with a forced draft fan 444. The fan 444 is driven by an electric motor 446 through a V-belt drive 448. There is a control panel 450 for controlling the rate of fuel incoming to the hammermill 432 by adjusting the speed of drive unit 437, and for adjusting the combustion air to that rate by positioning the damper in the forced draft system. The diameter of the conveying pipe 428 is sufficiently small so that at a conveying velocity of approximately 5000 feet per minute, the quantity of conveying air will always be less than the air needed for combustion, or more specifically, the quantities will be approximately equal at minimum firing rate. Since this minimum quantity of combustion air is within the control range of the forced draft fan dampering system, it is seen that this invention permits the air to be adjusted to the fuel rate automatically over the entire firing rate for optimum combustion. As is readily realized, the ground hog fuel is suspension fired in the Dutch oven 420. The hot gases pass through the opening under the nose arch 266. The suspension firing of the hog fuel in the Dutch oven 420 may be considered to be of primary combustion by primary burning. The hot gases from the Dutch oven 420, upon coming in contact with the hot gases from the sander dust combustion in the furnace 242, are more completely burned. In other words, the burning of these hot gases from the Dutch oven 420 by the hot gases from the sander dust may be considered to be an afterburning operation.

The operator with the controls in the control panel 450 may set the ratio of the air to the hog fuel being introduced through the pipe 428 into the Dutch oven 420. He can also change the firing rate by adjusting the speed of the drive unit 437 for the fuel supply conveyor 436 to the hammermill 432. However, any change in the speed of drive unit 437 causes a corresponding change to be simultaneously effected in the combustion air supply so that the ratio of air to hog fuel remains at the value pre-selected by him in the fuel-air ratio relay.

Likewise, the operator, by means of control panel 450 or by means of control panel 285 may set the ratio of air and sander dust being introduced into the furnace to the rate of steam generation as measured by the steam flow in line 300. Thus, it is seen that while the rate at which sander dust is introduced into furnace 242 may vary in some preselected proportion to steam flow, or may be introduced at a fixed rate selected by the plant operator, the ratio of sander dust to combustion air will remain fixed at the values calibrated into the control system. Specifically, he has the election of selecting the fuel-air ratio best suited to the material being fired in the Dutch oven; of selecting the firing rate in the Dutch oven; of selecting the ratio of steam to be produced from the firing of sander dust in furnace 242; or of selecting a fixed rate for the firing of the sander dust.

From the arrangement of the Dutch oven 420 and the burner head 232 in FIGURE 19, it is seen that the hog fuel is more completely burned in the Dutch oven 420 than in the Dutch oven 250. Because of the small size of particles fired, the automatic control of fuel-air ratios for optimum combustion, and the higher, more uniform, temperatures obtainable, hurnout can be virtually completed thus minimizing the carryover of smoke and unburned combustibles to furnace 242. Furthermore, the absence of a fuel bed permits changes in firing rates to be made instantaneously, permitting steam pressures to be held constant despite sudden changes in plant load. This is especially important in most plants of the type herein described, in that the steam pressure required for maximum dryer production is only a few pounds less than the set pressures allowed for the boiler safety valves. If pressures drop, substantial losses in production result. If pressures rise, the safety valve open with a loss of steam and fuel and a shortening of the life of the valve internal from the cutting action of the steam.

This is in contrast to the firing in Dutch oven 250 where much of the fuel drops through the grates before burning has been completed; where these unburned combustibles must be manually removed; where the flow of air through the fuel bed is extremely sensitive to changes in furnace draft and when such flows become excessive, substantially increase the number of unburned particles carried over to furnace 242 by becoming air or gas borne; where such excess air quantities cool the Dutch over, thereby decreasing the amount of fuel burned to completion and increasing the amount of smoke and unburned combustibles entering furnace 242; where temperatures cannot be maintained at a sufficiently high level to assure good combustion; where temperatures vary widely and are especially susceptible to change with variation in fuel quality, especially as to moisture content; where high moisture fuels cannot be fired without the formation of excessive smoke and unburned combustibles which carry over into furnace 242; where the firing of such high moisture fuels sharply reduces the steam output of the boiler; where changes in firing rate cannot be made sufficiently fast to be responsive to changes in plant load; where a drop in steam pressure, whether caused by wet fuel or by inability to adjust firing rate to plant load increase, adversely affects production costs by sharply increasing the time needed to dry panels. With the suspension firing of the ground hog fuel in the Dutch oven 420, it is possible to have a better controlled fire and more uniform temperatures that in the Dutch oven 250. With more uniform temperatures, it is possible to realize a longer life from the Dutch over and to realize lesser maintenance on the parts of the Dutch over such as on the grates 398. Further, with the suspension firing of the hog fuel in the Dutch oven 420, it is possible to eliminate one operator per shift. In other words, three operators per day are eliminated on the basis of a 24-hour day. This substantially lessens the cost of operation of the Dutch oven 420 and the furnace 242.

With the suspension firing of the hog fuel, it will be possible to fire with considerably less excess air. This is the air that is in excess of that needed to combine chemically with the fuel. It is also referred to as tramp air in the sense that the cold entering air robs heat from the furnace in that the air is heated from the entering plant temperature to the exit temperature from the boiler, viz., some 530° F. It is believed that a conservative estimate of this reduction would be at least 15%. This is equivalent to 1000 units of fuel annually at the mill where the sander dust firing portion of this invention is in operation and at current market prices is worth $2,500.

In addition to grinding the hog fuel in the hammermill 432, it is possible to grind other dry burnables such as paper and cardboard. In fact, a somewhat wet hog fuel can be ground and suspension fired in the Dutch over 420.

The burner heads 232 and 282 function as an ignition block. More particularly, these burner heads are hot, and the sander dust or the ground hog fuel, i.e., a comminuted combusible solid, strikes the hot burner heads, is spread apart, mixed with combustion air and ignited. Further, the burner heads form the flame pattern of the comminuted combustible solid. Also, the velocity of the comminuted combustible solid is reduced upon impinging on the burner head. Actually, the burner heads assist in mixing the comminuted combustible solid with air to realize a more thorough combustion of the solid as well as causing ignition to be started immediately uppon entering the furnace.

From the foregoing it is seen that I have provided apparatus and method for economically utilizing waste products, e.g., sander dust and ground hog fuel. The sander dust is difficult to handle and is generally regarded as a nuisance. In addition to these undesirable qualities, the sander dust is a definite fire hazard. At most mills, the hog fuel is of varying moisture content, due to the method of the removing of bark by streams of water under high pressure from a nozzle or by the wet storage of the logs in water prior to using. The grinding of the hog fuel to a small size makes it possible to suspension fire this moist hog fuel.

In the past, little though was given to the upgrading of hog fuel, either in the manufacture of by-products, or in using it efficiently as a fuel. Not only was it considered to have no value economically, it was treated as a nuisance to be disposed of in the easiest and most inexpensive manner possible. The wood waste burner, a common sight at virtually every mill, was adopted by the industry as the standard disposal method. Because of the enormous quantities of smoke and other pollutants discharged to the atmosphere however, they have been banned in areas and communities where there is an awareness of the pollution menace. This, together with the pressure of economic competition, is causing this attitude to change. In some cases, plants still do install equipment for firing other more expensive fuels such as gas and oil because the lower first cost and convenience in firing is thought to outweigh the lesser cost of the hog fuel. Part of this decision is based on the high cost of installing, operating and maintaining the conveyor system for handling the fuel. With this invention, it is seen that this cost is eliminated. Furthermore, the convenience in the controlled firing of hog fuel in suspension, as outlined herein, is substantially the same as for the other more costly fuels.

FIGURE 20 illustrates the firing of a finely comminuted combustible solid such as sander dust in conjunction with a more coarsely ground, less volatile, wood waste such as hog fuel. The fuels and the air for their combustion are separately controlled and separately admitted to the boiler where ignition is started and completed in the furnace section 502.

The boiler shown is a common type known in the trade as a two-drum integral furnace type with water walls. The front wall 542 contains tubes extending from the header 610 to the upper drum or steam drum 510. The two side walls contain tubes 504, shown typically, extending from the side water wall header 516 to the steam drum 510. The rear wall contains tubes 612 extending from the lower drum or mud drum 512 to the steam drum 510. Likewise, additional tubes 506, shown typically, are located in the boiler or convection section and connect the steam drum with the mud drum. Circulating tubes 508, connect the mud drum with the side water wall headers 516. It is seen that the heat generated in the furnace section is absorbed by the water wall tubes causing the water temperature to rise and to be partially formed into steam. This water and steam is of low weight per unit volume as compared to the water in the lower temperature zone of the boiler section. As a consequence, the water and steam mixture in the furnace water wall tubes flows upward to the steam drum and a corresponding water volume flows downward to the mud drum and into the water wall headers through circulators 508. The steam is separated from the water in the steam drum and flows to the plant through line 300.

There is also shown a bin 568 for the storage of hog fuel, a pipe or tube 570 for pneumatically conveying the hog fuel from the plant or mill to the bin, and a cyclone separator 572 for separating the fuel from the conveying air. At the bottom of the bin are shown two screw conveyors, 574 and 576. Conveyor 574 unloads the fuel from the bin, discharging it at one end into a truck or other hauling conveyance. Screw conveyor 576 unloads the fuel from the bin also, but discharges it at the opposite end through a transition spout 582 into a grinder or hammermill 584. Conveyor 576 is driven by a variable speed motor drive unit 580 through a chain and sprocket drive 578. The hammermill 584 is driven by a motor 586 or by an equivalent steam turbine drive. The cylindrically mounted rotating hammers in the hammermill reduce the fuel from a maximum 2″ size to a maximum size of approximately $5/16''$. Fan 588, driven by motor 590 through a V-belt drive, contains a special material handling wheel, and removes the ground hog fuel from the hammermill through duct 592 and conveys it through pipe or tube 594 into furnace 502. Ignition is started immediately upon entry into the furnace by striking the impingement type burner head 536 and by mixing with the combustion air admitted through a cylindrical opening 532 in the furnace front wall. Similarly, sander dust is conveyed through pipe or tube 212 into the furnace where ignition is started immediately upon entry by striking the impingement type burner head 232 and by mixing with the combustion air separately admitted through refractory tube 524.

Combustion air for the hog fuel is provided by fan 552 through transition duct 550 and windbox 522. The fan is driven by an electric motor 554 and V-belt drive. Air quantity is controlled by automatically positioning variable inlet vanes 556 in the fan inlet with damper controller 558. Similarly, combustion air for the sander dust is provided by fan 564 through transition duct 548 and windbox 520. The fan is driven by an electric motor 566 and V-belt drive. Air quantity is controlled by automatically positioning variable inlet vanes 560 in the fan inlet with damper controller 562. It would be possible to arrange the fan units so that a single motor drive unit could be employed, and in certain installations, this might be advantageous. However, lesser first cost tends to be offset by a lessening in operating flexibility attainable with separate drives for each.

Instruments and operating controls are shown in combustion control panelboard 596. The sander dust is controlled in the same manner as previously described and shown in FIGURES 17 and 18. The signal from steam flow transmitter 304 is received by indicator 598 and ratio controller 602 where it is reduced in proportion to the preselected setting, the reduced signal then being sent simultaneously to the unloading chain speed controller and to the variable inlet vane controller 562. Control station 608 contains a cut-back relay to automatically prevent the bin from emptying. It also permits the firing of the dust at a fixed or constant rate. The controls shown for the firing of the ground hog fuel are essentially a base-loaded type wherein the firing rate is controlled by the plant operator by the manual selection of the signal to be simultaneously sent to bin unloading screw drive 580 and to variable inlet vane controller 558. There is also shown a fuel-air ratio relay 604, permitting selection by the plant operator of the ratio of combustion air to fuel. In some installations, it might be desirable to control the firing rate of the hog fuel automatically from some source such as steam header pressure. In such a case, an additional relay would be required to establish an air signal in relation to the deviation of the actual pressure in the steam header and the desired or set-point pressure.

For startup purposes, and to assure stability of ignition, a gas-fired burner 530 is shown located between the sander dust and ground hog fuel burners. Maintenance of ignition stability would be especially important if only one fuel, either the sander dust or ground hog fuel, were being fired.

It is seen that the invention illustrated in FIGURES 20 and 21 permits a savings in first cost by eliminating the stoker and grates necessary for firing hog fuel in the type of boiler shown. It is also seen that the Dutch oven and grades, shown in FIGURES 1 and 19, are unnecessary. A further savings in first cost results from this type of firing in that it permits the use of competitively priced boiler units that are available from some thirty different manufacturers.

Grinding of the hog fuel prior to its admission to the furnace permits the fuel to be conveyed pneumatically with the elimination of costly conveyor chains. Also, storage bins can be made smaller, simpler, and at less cost. Control of combustion air in relation to fuel at all rates of firing improves efficiency by reducing the amount of excess air required. By starting the ignition process immediately upon entry of fuel into the furnace, the time needed to adjust fuel input to changes in steam flow requirements is minimal permitting steam header pressure to be held constant irrespective of variations in plant load. Other methods of firing hog fuel requiring grates cannot respond rapidly because of the larger size of fuel particle and the prior commitment of fuel onto the grates. In such installations, wide fluctuations in steam pressure are commonplace with costly losses in production the result.

Flame temperature from the sander dust is several hundred degrees higher than that from the hog fuel, this the result of differences in fuel characteristics. Sander dust is dry as compared to a 50% moisture content commonly contained in hog fuel. This moisture must be driven off before ignition temperatures are reached and heat, of course, is lost in the process. Certain resins and glues of high volatility are used in the manufacture of plywood and small quantities of these are sometimes removed and mixed with the dust in the sanding operation. Sander dust particles are of extremely small size and thus optimum opportunity is provided for their "finding" the air needed for combustion. This means firing with less excess air and at higher temperature. From this it is seen that by directing the hotter sander dust fire downwardly into the cooler zone of firing from the hog fuel, combustion of the latter is improved with a minimum production of smoke, ash or unburned combustibles for carryover as pollutants into the atmosphere.

By separately admitting combustion air for each fuel, an extremely flexible system of firing is attained. For example, if one fuel is completely shut off, the corresponding air therefore can also be shut off so as not to upset the fuel-air relationship of the fuel being fired. Furthermore, where only hog fuel or sander dust is being fired, a stabilizing fuel of gas or oil may be fired. Again, the air for the stabilizing fuel would be provided independently from that for the two basic fuels.

The arrangement permits the use of a wide selection of control components to enable a single plant operator to control firing from a single panelboard location. This capability, plus the elimination of grate cleaning and other menial tasks, permits a reduction in the personnel required for operation as compared to that usually required for hog fuel plants.

Finally, the firing of hog fuel on grates requires that they be cleaned periodically, about an hour per day being needed for this. Large quantities of cold air are admitted, the cooling effect of which creates extremely poor conditions for combustion. Not only is this inefficient, but it causes the formation and emission of substantial quantities of smoke and other pollutants to the atmosphere.

In FIGURE 22, there is shown a modification of the burner system for firing sander dust or other finely comminuted combustible solid in the furnace 602 of a pressurized type of packaged boiler. These units are of gastight construction enabling them to be fired under positive pressure with a single fan unit which effects a substantial saving in first cost. Further savings are obtained by shop fabrication and assembly at the place of manufacture.

To obtain the highest possible steam output for a given physical size, the sides, top, and bottom of the furnace are encased with tubes 604 which are partially shown.

Gas flow is horizontal; from left to right in the furnace section; turning 180° through opening 606; then from right to left through the boiler section (not shown) to finally exit through a 90° turn into the stack 640.

The unit shown is gas-fired with a gas ring 608 admitting fuel around the circular furnace opening through a series of uniformly spaced orifices in the ring. Gas flow is automatically regulated by modulating a control valve (not shown) so as to maintain a constant steam pressure.

Combustion air is supplied to the wind box 648 by the motor driven fan 610 through a discharge damper 612. A portion of the air passes through a series of louvres in register 614 to enter the furnace around the center of the opening in the refractory throat 652. The remaining air passes through a second series of louvres in register 616 to enter the throat tangentially through the continuous annular opening 650. The effect is to impart a motion to the air which aids in its mixing with the gas fuel. A mechanical linkage arrangement 618, 620 and 622, permits the operator 626 to automatically control air flow in proportion to gas fuel flow by simultaneously positioning damper 612 and register louvres 614 and 616.

Upon reaching a safe furnace temperature, sander dust can be admitted from the bin system previously described, through the conveying tube 634, the hose connection 632, and the burner tube 630. Upon entering the furnace, the dust is mixed with air and ignited, the impact piece 636 aiding in the mixing and ignition as well as shaping the pattern of the flame.

The added air needed for the combustion of the dust is provided by an adding relay. This increases the signal to the operator 626 in proportion to the feed rate of the dust so that the air quantity will be correct for the total of the two fuels being fired.

The impact piece is made of a heat resisting metal, such as stainless steel and may be solid as shown, or may be fabricated from a light gage plate of about ⅛" thickness. It is suspended in the path of the incoming sander dust by three stainless steel pipes or tubes which are welded thereto. The opposite end of each pipe or tube is supported by the burner tube 630 through welded stainless steel attachments or spacers 640. Two spacers are used for each pipe or tube 638 to provide rigidity with minimum weight and with minimum exposure to heat of uncooled metal surface. The burner tube and burner assembly is supported at the windbox front plate by the bolted housing 628. The arrangement permits the entire burner assembly to be removed by detaching the hose connection 632 and unbolting housing 628. It further permits the welded assembly of burner cone 636, support tubes 638, spacers 640, and burner tube 630. This arrangement, plus the hose connection 632, permits the adjustment of burner position for optimum combustion conditions. The support tubes 638 are continuously cooled by the circulation of air through them. They are of sufficient length to exclude any possible entry of gas. An interlock is provided to assure pressure in burner tube 630 before fan 610 is started, this to avoid any possibility of furnace pressure exceeding the pressure in the burner tube. Other interlocks prevent the introduction of sander dust into the furnace unless a gas sustaining flame is present and unless furnace temperature is above the dust ignition point.

It is seen that the modification described retains the unique feature of separating the dust conveying air from the combustion air so that the latter can be automatically controlled and admitted as needed for optimum firing conditions. This is especially important in this type of furnace since a minimum of refractory is employed and temperatures drop rapidly at reduced rates of fire. This is in contrast to the conventional system for firing dust which admits more air than is needed for combustion, the excess causing a further cooling effect at partial loads. As temperatures approach the fuel ignition temperature, combustion becomes more unstable and uncertain with the possibility of raw fuel being carried on into the furnace. In many instances, the fuel is "pocketed" in low velocity areas, only to be reignited when more favorable conditions for combustion are restored. Such combustion is uncontrolled and forms the basis for most furnace explosions.

In FIGURE 19, the conveying of the solid sander dust through the tube 212 and the conveying of the solid comminuted hog fuel through the pipe 428; in FIGURE 20, the conveying of the solid sander dust through the tube 212 and the conveying of the more solid coarsely ground wood waste through the pipe or tube 594; and, in FIGURE 22, the conveying of solid sander dust through conveying tube 634 in a gaseous fluid comprising oxygen such as air is in the ratio of the air or gaseous fluid to solid in the range of about 55 cubic feet of said gaseous fluid or air to one cubic foot of said solid to approximately 475 cubic feet of said gaseous fluid or air to one cubic foot of said solid. With this ratio of air or gaseous fluid to solid the solid can be conveyed without combustion occurring in the conveying tube or pipe. In other words, with these ratios of air or gaseous fluid to solid it is possible to convey the solid in an air suspension. As previously stated the solid has been carried in an air suspension at a speed of 5000 feet per minutes or at a speed of approximately one mile per minute.

FIGURES 25, 26 and 29 illustrate a typical burner arrangement. The combustion air enters the furnace through a refractory duct 270 and which duct 270 is lined with metal 668 and 670. The refractory duct 270 in relation to the furnace may be like the refractory duct 270 in FIGURE 1. The metal 670 is an alloy resistant to oxidation at high temperature and is shown gradually expanding at the outlet to provide adequate room for the burning process taking place around the burner cone 666.

As in FIGURE 1, there is a conveying tube or pipe 212 for conveying the mixture of the finely cominuted solid such as sander dust, hog fuel, sawdust and the like. The comminuted particles may have a particle size ranging from that of being practically a dust to dimensions of approximately 3/8" to even 1/2". The wood particles may be made in a hammer mill or a ball mill or other grinding or chipping equipment and may be made from relatively large pieces of wood. The wood may have been treated in various ways such as by creosoting, being treated with a preservative such as pentachlorophenol, painted or stained and the like. In the ball mill or hammer mill or other comminuting means, the wood is reduced in size to a dimension of 1/2" or less and then carried in an air suspension in the conveying pipe or tube to the nozzle 662. The nozzle 662 is connected to the pipe 212 by means of a union 660. On the outer end of the nozzle 662 there is attached a number of brackets 664. The brackets 664 on their outer end connect with the burner cone 666. It is seen that the brackets 664 are not hollow tubes and do not project through the burner cone 666 as in previous installations of burner cones on the end of the conveying line or tube 212.

The brackets 664 and the burner cone 666 are subjected to high temperatures in the furnace such as 2000° F. or maybe 2,200° F. Because of this, the brackets 664 and the cone 666 are fabricated from a special high temperature stainless steel alloy suitable for operation up to temperatures of 2,300° F. The attachment of the brackets 664 to the nozzle 662 and the cone 666 is made by welding with a rod of similar material to the brackets and cone.

As a variation of the special high temperature stainless steel alloy for the brackets 664 and the cone 666, these brackets and cone may be made from a high temperature expanded metal or mesh to form a supporting base for a refractory material such as aluminum oxide or other refractory material. The expanded metal or mesh in the brackets would be attached by welding to the nozzle 662 and the expanded metal or mesh in the cone 666. The refractory would be cast or pounded in place with both faces struck off so as to leave a thin refractory cover over the metal.

The end of the nozzle 662 is a high temperature alloy. The coupling 660 welded thereto permits a threaded attachment to be made to the fuel conveying line 212. The arrangement permits the lines to be tightly butted together so as to avoid loosening during operation. The assembly can be easily removed should maintenance or repair become necessary. This arrangement also permits the use of an inexpensive material for the fuel line 212.

FIGURES 27 and 28 illustrate another manner of conveying combustion gas and a suspension of finely comminuted solid and air to the furnace. In FIGURE 27 there is illustrated an arrangement for supporting the burner cone 666 from the air liner duct 670. The arms 672 and the burner cone 666 are fabricated from a high temperature alloy suitable for operation at temperatures to 2,300° F. The arms 672 are secured to the cone 666 by welding with a rod of similar material as the cone 666 and the nozzle 662. The attachment of the arms 672 to the liner 670 are achieved by means of a pin connection. There is welded to the liner 670 a bracket 674 having a passageway or hole therein. The arm 672 has a hole on its outer end and which hole or passageway is aligned with the hole or passageway in the brackets 674. A pin 676 is positioned in the two aligned passageways and a cotter key 678 is inserted to position the arms 672 with respect to the brackets 674 and thereby positions the burner cone 666 near the outlet end of the nozzle 662. In this manner, it is possible to quickly and readily change a cone at regular maintenance intervals.

In FIGURES 30, 31, 32 and 33, there is illustrated another means for attaching the burner cone 666 with respect to the conveying tube or pipe 212 for conveying a mixture of a finely comminuted solid and a gaseous medium such as air.

It is seen that a nozzle 680 is attached to the end of the conveying tube 212 by means of the union or coupling 660. The end of the nozzle 680 flares outwardly as indicated at 682. The cone 666 is positioned partially inside of 682 and is attached to 682 by means of straight spacers 684. In FIGURE 34 it is seen that the cone 666 is partially positioned inside of the 682 by means of curved spacers 686. Again, the nozzle 680, the flared portion 682, the spacers 684 or 686 and the cone 666 are made of a special high temperature stainless steel alloy capable of withstanding temperatures to approximately 2,300° F.

With the curved spacers 686 there is imparted to the solid comminuted fuel, as it enters the furnace, a spinning or rotating motion and which spinning or rotating motion assures that the solid comminuted fuel coming into the furnace ignites in a minimum of time.

The materials which flow through the conveying tube 212 and then through the nozzle 662 or 680 and 682 so as to strike the cone 666, as previously stated, are finely comminuted solids of a particle size of approximately 1/2" or smaller, even down to a particle size of practically dust such as sand or dust. The finely comminuted solid is conveyed through the conveying tube 212 and the nozzles by means of a gaseous medium such as air and which comprises oxygen. Such a mixture, unless carefully controlled and regulated, is subject to combustion in the tube 212. This is especially so because on the open end of the nozzle the finely comminuted solid ignites and bursts into flame so as to burn substantially instantaneously. Therefore, it is necessary to control the ratio of the finely comminuted solid to the gaseous fluid such as air. From experience, I have found that the ratio of the gaseous fluid such as air to said finely comminuted solid functions in the range of about 55 cubic feet of said gaseous fluid to 1 cubic foot of said solid to approximately 475 cubic feet of said gaseous fluid to 1 cubic foot of said solid. As previously stated in the patent application, with respect to FIGURE 1, the air blower 216 was turned off or stopped. The velocity in the pipe 212 due to the amount of air passing through the pipe 212 is approximately 5,000 feet per minute or about 1 mile per minute. With the turning off of the air blower 216 the velocity of the finely comminuted solid in the pipe 212 became substantially zero and if the gaseous medium such as air were to support combustion, this combustion would have been supported because of the flame in the furnace and the open end of the nozzle in contact with the flame. There was no flashback in the conveying tube under these circumstances and therefore no support of combustion of the finely comminuted solid in the air suspension in the tube 212. From practical experience, the mixture of the air and the finely comminuted solid did not support combustion.

The ability to control the firing of the finely comminuted solid over a wide range of feed of the finely comminuted solid to the furnace results from the conveying of the fuel to the furnace in a high pressure system. In this system, for example, some 4,000 pounds of fuel per hour, i.e., 4,000 pounds of finely comminuted solid per hour, can be conveyed with 275 cubic feet per minute of air. To convey this amount of fuel with a low pressure system would require approximately 2,250 cubic feet per minute or about eight times that required in the high pressure system. The conveying velocities for any given system, either high pressure or low pressure conveying system, remain fixed and therefore these same quantities of air would be needed for handling lesser amounts of fuel or finely comminuted solid. With a ten to one turndown range the fuel firing rate would vary between 4,000 and 400 pounds of fuel per hour. Also, the combustion air requirement through the refractory duct 270 would vary from 7,000 to 700 cubic feet per minute. From this it is seen that the combustion air is controllable over a turndown of excess of ten to one in the high pressure system as contrasted with the low pressure system where the turndown of the combustion air is from about three to one.

The most common method of supplying combustion air to a burner is with a forced draft fan. A damper is usually employed to regulate the air flow to suit a particular firing rate. The better made dampers will leak about 6% of the maximum air flow in the "closed" position or 420 cubic feet per minute in the above example. Adding this to the conveying air quantities gives minimums of 695 and 2,670 cubic feet per minute for the high and low pressure systems respectively. While this is not enough to affect the turndown range of the high pressure system it does further reduce the range of the low pressure system to a little over two and one-half to one as compard with the turndown range of ten to one for the high pressure system.

In the high pressure system utilized in the invention described herein, the fuel enters the furnace at a velocity of about 5,000 to 5,500 cubic feet per minute, viz approximately one mile per minute. Since optimum operation requires that ignition be started as quickly as possible it is necessary to mix the fuel with the separately admitted combustion air as soon as the fuel or finely comminuted solid enters the furnace.

To effectively control the pollutants from separately fired fuel sources such as hog fuel, it is necessary to be able to position the burner so that it can be fired through the fire containing the pollutants from the hog fuel. As previously stated, the pollutants from the hog fuel can vary over a wide spectrum of chemicals such as carbon monoxide, low chain length hydocarbons, certain resins and tars and possibly carbon black. With the finely comminuted solid hitting the burner cone 666 and spreading outwardly and forming a flame pattern the finely comminuted solid bursts or explodes into flame to a relatively high temperature of approximately 2,000° F. and mixes with the pollutants. The pollutants are burned more completely to form carbon dioxide and water. In other words, the pollutants are burned so as to form an end product such as water and carbon dioxide and which end products are not objectionable.

One of the objectives is accomplished by positioning the fuel tube and the nozzles 662, 680 and the flare 682 on the center line axis of the cylindrically shaped air duct 270. A conical-shaped flame pattern is generated which gradually expands as it moves away from the cone as the finely comminuted solid moves away and outwardly from the cone. The direction of the flame in the furnace is controlled by the position selected for the air duct 270. The minimizing of the conveying air quantity also enhances the safety of the installation. In low pressure systems, the relatively low ratio of fuel to air results in a combustible mixture and the propagation of fire in incoming lines to the furnace is not uncommon. Therefore, the use of a low pressure system for conveying a finely comminuted solid is a hazard.

With a high pressure system and at a conveying rate of 400 pounds of fuel per hour, the 275 cubic feet per minute of air flow is only 46% of the 600 cubic feet per minute of air needed to theoretically support combustion of the comminuted solid. As is readily seen, at all higher fuel rates, with a minimum of 275 cubic feet per minute of air flow, the percentage of air needed to support combustion is lower. Therefore, at the higher fuel flow rates for 275 cubic feet per minute of air flow the factor of safety increases.

In contrast with this, the 2,670 cubic feet per minute of air required in a low pressure system for supporting combustion of 400 pounds of comminuted solid fuel per hour is sufficiently great that combustion will be supported. In fact, in a low pressure system at a rate of flow at 2,670 cubic feet per minute of air, there is sufficient oxygen present to theoretically support the combustion of 1,780 pounds of comminuted solid fuel or sander dust per hour.

A further enhancement of the safety of the high pressure system and my invention lies in the position of the fuel conveying line which permits its exterior surface to be constantly cooled by the entering combustion air through the duct 270. This, together with a high conveying velocity of the mixture of air and finely comminuted solid, positively prevents the propagation of fire in the fuel line. More particularly, with the exterior surface of the fuel line 212 cooled by the combustion air in the duct 270, the temperature of the mixture of air and finely comminuted solid is below that of the flame temperature or flash temperature of the mixture. Therefore, with the temperature below the flash temperature or the flame temperature the possibility of combustion in the fuel line 212 is very small.

The conveying air for conveying the comminuted solid must be maintained in the safe range. From experience this safe range is approximately 55 cubic feet per minute of air per one pound per minute of fuel as a comminuted solid. At this ratio of air to solid there is practically no possibility of combustion occurring in the conveying tube or line for conveying the comminuted solid from the source of the comminuted solid to the furnace. Of course, at lower ratios of 55 cubic feet per minute to ten pounds per minute of fuel as comminuted solid there is a greater safety factor and less possibility of combustion occurring in the conveying line.

This safety factor is important and the elimination of a possibility of combustion in the conveying line is important as some furnace operators inadvertently permit positive pressure in the furnace. With positive pressure in the furnace the flames in the furnace may be forced into the conveying tube conveying air and solid fuel. The possibility of combustion taking place in the conveying line is increased. Therefore, it is necessary to have insufficient air to support combustion in the conveying tube. With a ratio of 55 cubic feet of conveying air per pound of comminuted solid there is a safety factor in the air-to-solid mixture in the conveying tube. It may be possible to have a larger ratio than 55 cubic feet of air to one pound of solid but then there is an increasing possibility of combustion with an increase in air to fuel ratio.

Having presented my invention what I claim is:

1. An apparatus for burning finely comminuted combustible cellulose base material such as wood or paper, comprising:
(a) a first tube for conveying said material in a gaseous fluid;
(b) a second tube for conveying gaseous oxygen;
(c) said first and second tubes being in a concentric relationship;
(d) a burner head;
(e) means positioning the burner head adjacent the outlet end of the first tube;
(f) said positioning means comprising at least one open ended tube;
(g) said positioning tube projecting through the burner head at one end thereof;
(h) the opposite end of the positioning tube terminating outside of the first tube and in the stream of gaseous oxygen;
(i) said positioning tube connected with said first tube; and,
(j) said positioning tube functioning to convey the gaseous oxygen throughout its length for cooling said tube.

2. An apparatus according to claim 1 wherein:
(a) said burner head presents a conical surface to the end of said first tube; and
(b) said positioning means comprises a multiplicity of open ended tubes connecting the burner head and the first tube.

3. An apparatus according to claim 1, wherein
(a) said first and second tubes are held by support means and are directed downwardly relative thereto; and
(b) the first tube terminates inside of the second tube.

4. An apparatus according to claim 1, wherein
(a) the surface of the burner head facing the first tube being of a ceramic material;
(b) the opposite surface being of metal; and
(c) said positioning tube connecting with the metal surface.

5. An apparatus according to claim 2, wherein
(a) said conical surface is of a ceramic material; and
(b) said positioning tubes connecting with each other on that side of the burner head away from the first tube.

6. An apparatus according to claim 1, and further comprising:
(a) a first air compressing means connecting with the second tube for supplying the gaseous oxygen; and,
(b) said first tube connecting with a source of the finely comminuted combustible solid.

7. An apparatus according to claim 6, said apparatus comprising:
(a) said source of the finely comminuted combustible solid being a storage bin and feeding means;
(b) said storage bin being a floating storage bin;
(c) means to support the storage bin to allow the storage bin to assume various heights dependent upon the weight of the finely comminuted combustible solid in the storage bin and without influence of friction from storage bin guides;
(d) means for feeding the solid from the storage bin to the first tube; and,
(e) a second air compressing means connecting with the first tube for supplying air to the first tube for conveying the finely comminuted combustible solid.

8. An apparatus according to claim 7, said storage bin support means including:
(a) a frame adjacent to said storage bin; and,
(b) a spring and a support rod connecting the storage bin to suspend the storage bin from the frame.

9. An apparatus according to claim 7, said apparatus comprising:
(a) sensing means for sensing the amount of the solid in the storage bin;
(b) means responsive to the sensing means for controlling the fuel feeding means for feeding the solid from the storage bin to the first tube; and,
(c) means responsive to the sensing means for controlling the second air compressing means.

10. An apparatus according to claim 7, said apparatus comprising:
(a) a furnace;
(b) said first tube and said second tube terminating in the furnace;
(c) a boiler located in the furnace;
(d) a steam line connecting with the boiler;
(e) means for sensing the steam flow in the steam line;
(f) a sensing means for sensing the amount of the solid in the storage bin;
(g) first control means responsive to the solid sensing means for controlling the fuel feeding means for feeding the solid from the storage bin to the first tube;
(h) said steam flow sensing means connecting with and influencing the first control means;
(i) second control means responsive to the solid sensing means for controlling the second air compressing means; and
(j) said steam flow sensing means connecting with and influencing the second control means.

11. A furnace for heating a boiler, said furnace comprising:
(a) a first portion for burning hog fuel;
(b) a second portion for suspension firing a finely comminuted combustible solid;
(c) said first portion openly connecting with said second portion;
(d) grate means in the first portion adapted for burning hog fuel in primary combustion to form first products of combustion; and,
(e) means comprising a first tube for conveying a finely comminuted solid in a gaseous fluid, a second tube concentrically surrounding the first tube for conveying gaseous oxygen and a burner head adjacent the end of said first tube, said tube means located in the second portion and in an area directly adjacent said open connection between said portions whereby the first products of combustion are more completely burned.

12. A method for furnishing thermal energy to a furnace and to a boiler, said method comprising:
(a) burning hog fuel in primary combustion to form first products of combustion;
(b) conveying a finely comminuted solid and gas mixture in a first tube to a burner head;
(c) conveying oxygen in a second tube concentrically surrounding said first tube to said burner head; and,
(d) burning said finely comminuted combustible solid with the first products of combustion in an area directly adjacent said hog fuel burning to have secondary combustion more completely burn the first products of combustion.

13. A method according to claim 12, said method comprising:
(a) burning said hog fuel on grates to form the first products of combustion; and,
(b) said solid being sander dust.

14. A method according to claim 12, said method comprising:
(a) said hog fuel being finely comminuted hog fuel;
(b) burning said hog fuel in an air suspension to form the first products of combustion; and,
(c) said solid being sander dust.

15. An apparatus for burning a finely comminuted combustible solid having a large surface area, said apparatus comprising:
(a) a first tube for conveying the solid in a gaseous fluid containing oxygen;
(b) first means to furnish the gaseous fluid;
(c) said solid and gaseous fluid being in a ratio always providing less oxygen than needed to support combustion;
(d) a burner head;
(e) at least one second open ended tube connecting the burner head to the outside periphery of the first tube tube;
(f) a third means for introducing a flow of gaseous oxygen near the outlet end of the first tube; and
(g) one end of said second tube being in communication with said flow and functioning to convey the gaseous oxygen as a cooling gas for said tube during the burning of said solid.

16. An apparatus according to claim 15, wherein:
(a) said burner head presents a conical surface to the open end of the first tube; and
(b) there are a multiplicity of said second tubes connecting with this burner head and the first tube.

17. An apparatus for burning a finely comminuted combustible solid having a large surface area in proportion to its volume, said apparatus comprising:
(a) a first tube for conveying the solid in a gaseous fluid containing oxygen;
(b) a first means for furnishing the gaseous fluid and for varying the ratio of the solid to said gaseous fluid in a safe range not to exceed about 55 cubic feet of said gaseous fluid to one pound of said solid;
(c) a burner head;
(d) a second means positioning the burner head adjacent the outlet end of the first tube; and,
(e) a third means for introducing a flow of gaseous oxygen near the outlet end of the first tube.

18. An apparatus according to claim 17, said apparatus comprising:
(a) said third means being a second tube;
(b) the first and second tubes being directed downwardly; and,
(c) said first tube terminating inside of the second tube.

19. An apparatus according to claim 17, said apparatus comprising:
(a) an air compressing means connecting with the third means for supplying the gaseous oxygen; and,
(b) said first tube connecting with a source of the finely comminuted combustible solid.

20. An apparatus according to claim 17, said apparatus comprising:
(a) said first tube connecting with a source of the finely comminuted combustible solid;
(b) said source of the finely comminuted combustible solid being a storage bin and feeding means;
(c) said storage bin being a floating storage bin;
(d) means to support the storage bin to allow the storage bin to assume various heights dependent upon the weight of the finely comminuted combustible solid in the storage bin and without influence of friction from storage bin guides;
(e) means for feeding the solid from the storage bin to the first tube; and,
(f) a pneumatic conveying means connecting with the first tube for supplying air to the first tube for conveying the finely comminuted combustible solid.

21. An apparatus according to claim 20, said storage bin support means including:
(a) a frame adjacent to said storage bin; and,
(b) a spring and a support rod connecting the storage bin to suspend the storage bin from the frame.

22. An apparatus according to claim 20, said apparatus comprising:
(a) sensing means for sensing the amount of the solid in the storage bin;
(b) means responsive to the sensing means for controlling the fuel feeding means for feeding the solid from the storage bin to the first tube; and
(c) means responsive to the sensing means for controlling the pneumatic conveying means.

23. An apparatus according to claim 20, said apparatus comprising:
(a) a furnace;
(b) said third means being a second tube;
(c) said first tube and said second tube terminating in the furnace;
(a) a boiler located in the furnace;
(e) a steam line connecting with the boiler;
(f) means for sensing the steam flow in the steam line;
(g) a sensing means for sensing the amount of the solid in the storage bin;
(h) first control means responsive to the solid sensing means for controlling the fuel feeding means for feeding the solid from the storage bin to the first tube;
(i) said steam flow sensing means connecting with and influencing the first control means;
(j) second control means responsive to the solid sensing means for controlling the pneumatic conveying means; and
(k) said steam flow sensing means connecting with and influencing the second control means.

24. A method for conveying a finely comminuted combustible solid, said method comprising:
(a) admixing the solid with a first gas comprising oxygen to form a mixture of the gas and the solid with the ratio of the solid to the gas always providing less oxygen than needed to support combustion;
(b) the ratio of the first gas to the solid being in the safe range not to exceed about 55 cubic feet of the first gas to one pound of the solid; and,
(c) conveying the mixture to a desired location.

25. A method according to claim 24, said method comprising:
(a) conveying the mixture in a first tube; and,
(b) conveying a second gas comprising oxygen in a second tube and the second tube being in a concentric relationship.

26. A method according to claim 24, said method comprising:
(a) at said desired location introducing said mixture of the first gas and the solid into an atmosphere at an elevated temperature;
(b) admixing said solid with sufficient gaseous oxygen to burn said solid; and,
(c) burning said solid in a gaseous suspension.

27. A method according to claim 24, said method comprising:
(a) at said desired location directing said mixture of the first gas and the solid to a burner head to disperse the solid into an atmosphere at an elevated temperature;
(b) admixing said solid with sufficient gaseous oxygen to burn said solid; and,
(c) burning said solid in a gaseous suspension.

28. A method for furnishing thermal energy to a furnace, said method comprising:
(a) burning a first fuel in primary combustion in said furnace to form first products of combustion;
(b) a first means for conveying a finely comminuted combustible solid in a gaseous fluid to said furnace and for varying the ratio of the gaseous fluid to said solid in the safe range not to exceed about 55 cubic feet of said gaseous fluid to one pound of said solid; and,
(c) burning said finely comminuted combustible solid in said furnace and in the vicinity of and admixed with the first products of combustion to have secondary combustion to more completely burn the first products of combustion.

29. A method according to claim 28 and comprising:
(a) said first fuel and said solid being a cellulose base material such as wood and paper.

30. A method according to claim 28, said method comprising:

(a) said first fuel being hog fuel;
(b) burning said hog fuel on grates to form the first products of combustion; and,
(c) said solid being wood.

31. A method according to claim 28, said method comprising:
(a) said first fuel being finely comminuted hog fuel;
(b) burning said hog fuel in an air suspension to form the first products of combustion; and,
(c) said solid being wood.

References Cited

UNITED STATES PATENTS

| | | | |
|---|---|---|---|
| 1,562,411 | 11/1925 | Caracrist et al | 110—106 |
| 2,226,923 | 12/1940 | Cross | 110—106 |
| 2,267,025 | 12/1941 | Grindle | 110—104 |
| 2,514,768 | 7/1950 | Kennedy | 110—104 |
| 2,903,980 | 9/1959 | Gorin | 10—28 |
| 3,286,666 | 11/1966 | Ohlsson | 110—28 |

FOREIGN REFERENCES

| | | |
|---|---|---|
| 737,151 | 9/1955 | Great Britain. |
| 756,803 | 9/1956 | Great Britain. |

KENNETH W. SPRAGUE, Primary Examiner

U.S. Cl. X.R.

110—105